(12) United States Patent
Takai et al.

(10) Patent No.: US 9,539,882 B2
(45) Date of Patent: Jan. 10, 2017

(54) AIR CONDITIONING REGISTER

(71) Applicant: TOYODA GOSEI CO., LTD., Kiyosu-shi, Aichi-ken (JP)

(72) Inventors: Hajime Takai, Kiyosu (JP); Mitsuo Ogura, Kiyosu (JP); Minoru Shibata, Kiyosu (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 834 days.

(21) Appl. No.: 13/954,233

(22) Filed: Jul. 30, 2013

(65) Prior Publication Data
US 2014/0080399 A1 Mar. 20, 2014

(30) Foreign Application Priority Data

Sep. 20, 2012 (JP) ................................ 2012-207323

(51) Int. Cl.
*B60H 1/34* (2006.01)
(52) U.S. Cl.
CPC .................................. *B60H 1/3421* (2013.01)
(58) Field of Classification Search
CPC .................................................... B60H 1/3421
USPC ........................................................ 454/155
See application file for complete search history.

(56) References Cited

U.S. PATENT DOCUMENTS

| | | | | |
|---|---|---|---|---|
| 5,480,350 A * | 1/1996 | Naruse | ................. | B60H 1/3421 454/155 |
| 6,881,139 B2 * | 4/2005 | Yang | .................... | B60H 1/3421 454/155 |
| 6,893,338 B2 * | 5/2005 | Katagiri | ............... | B60H 1/3421 454/155 |
| 7,018,288 B2 * | 3/2006 | Okada | .................. | B60H 1/3421 454/155 |
| 7,604,533 B2 * | 10/2009 | Ogura | .................. | B60H 1/3421 454/143 |
| 9,358,860 B2 * | 6/2016 | Park | ..................... | B60H 1/3421 |
| 2002/0178744 A1 * | 12/2002 | Tanabe | ................. | F24F 13/075 62/407 |
| 2005/0239391 A1 * | 10/2005 | Shibata | ............... | B60H 1/3421 454/155 |
| 2006/0014485 A1 * | 1/2006 | Sousa | ................. | B60H 1/3421 454/315 |

(Continued)

FOREIGN PATENT DOCUMENTS

JP 4055693 B2 12/2007

*Primary Examiner* — Alissa Tompkins
*Assistant Examiner* — Frances F Hamilton
(74) *Attorney, Agent, or Firm* — Posz Law Group, PLC

(57) ABSTRACT

An air conditioning register includes a downstream fin, primary upstream fins, a secondary upstream fin, and an operation knob slidably attached onto the downstream fin. The operation knob sandwiches a shaft of the secondary upstream fin. The air conditioning register has a link mechanism that includes arms and a coupling rod. The arms extend from pivots of the primary and secondary upstream fins in a direction orthogonal to the pivots, and have a pin at the tip of the arms. The coupling rod couples the respective pins. The distance between the pivot and the pin in the arm of the secondary upstream fin is longer than the distance between the pivot and the pin in the arm of each primary upstream fin. The coupling rod includes coupling portions, each of which couples the pins of an adjacent pair of the arms. Adjacent coupling portions are pivotally coupled.

6 Claims, 14 Drawing Sheets

(56) References Cited

U.S. PATENT DOCUMENTS

| | | | | |
|---|---|---|---|---|
| 2007/0111653 A1* | 5/2007 | Endou | ............... | B60H 1/3421 |
| | | | | 454/155 |
| 2008/0119124 A1* | 5/2008 | Okuno | ............... | B60H 1/3428 |
| | | | | 454/69 |
| 2009/0286462 A1* | 11/2009 | Goto | ............... | B60H 1/3428 |
| | | | | 454/155 |
| 2010/0120347 A1* | 5/2010 | Gehring | ............... | B60H 1/345 |
| | | | | 454/155 |
| 2014/0120826 A1* | 5/2014 | Takai | ............... | F24F 13/075 |
| | | | | 454/318 |
| 2015/0328959 A1* | 11/2015 | Suzuki | ............... | B60H 1/3421 |
| | | | | 454/155 |

* cited by examiner

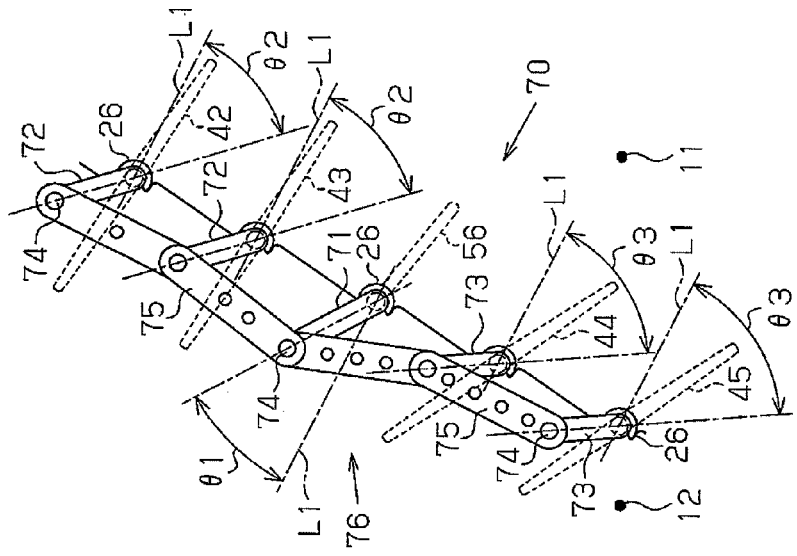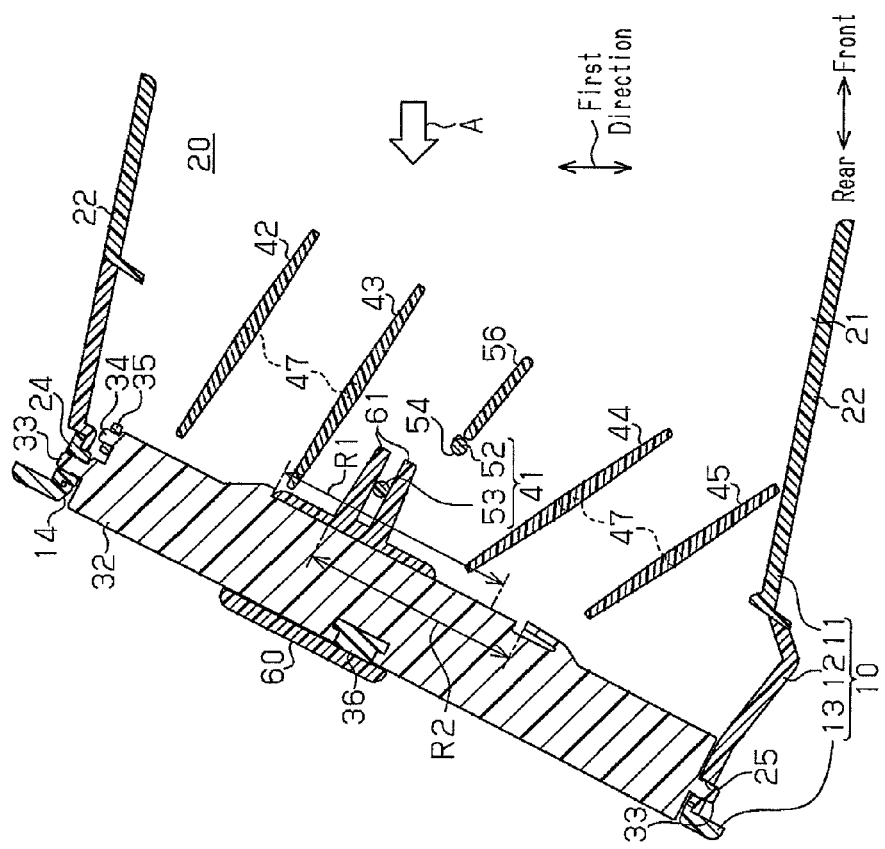
Fig.12B
Fig.12A

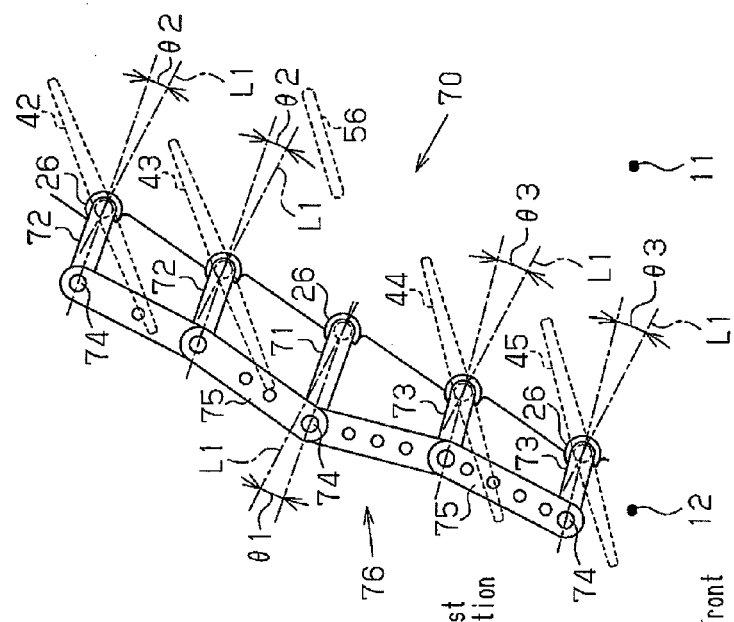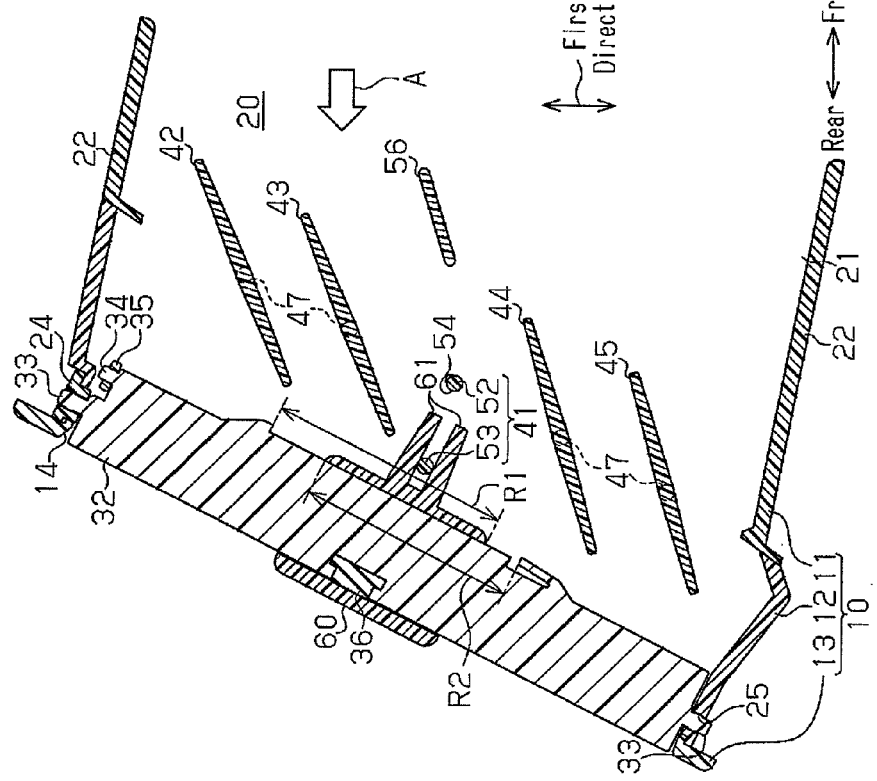

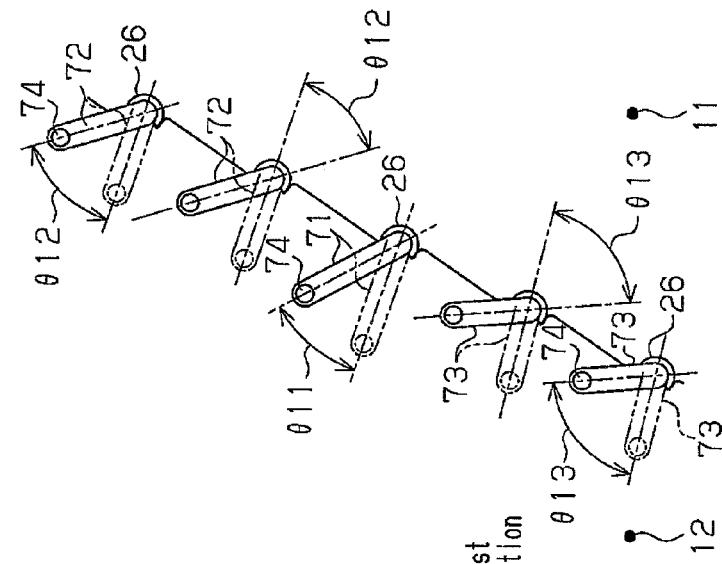
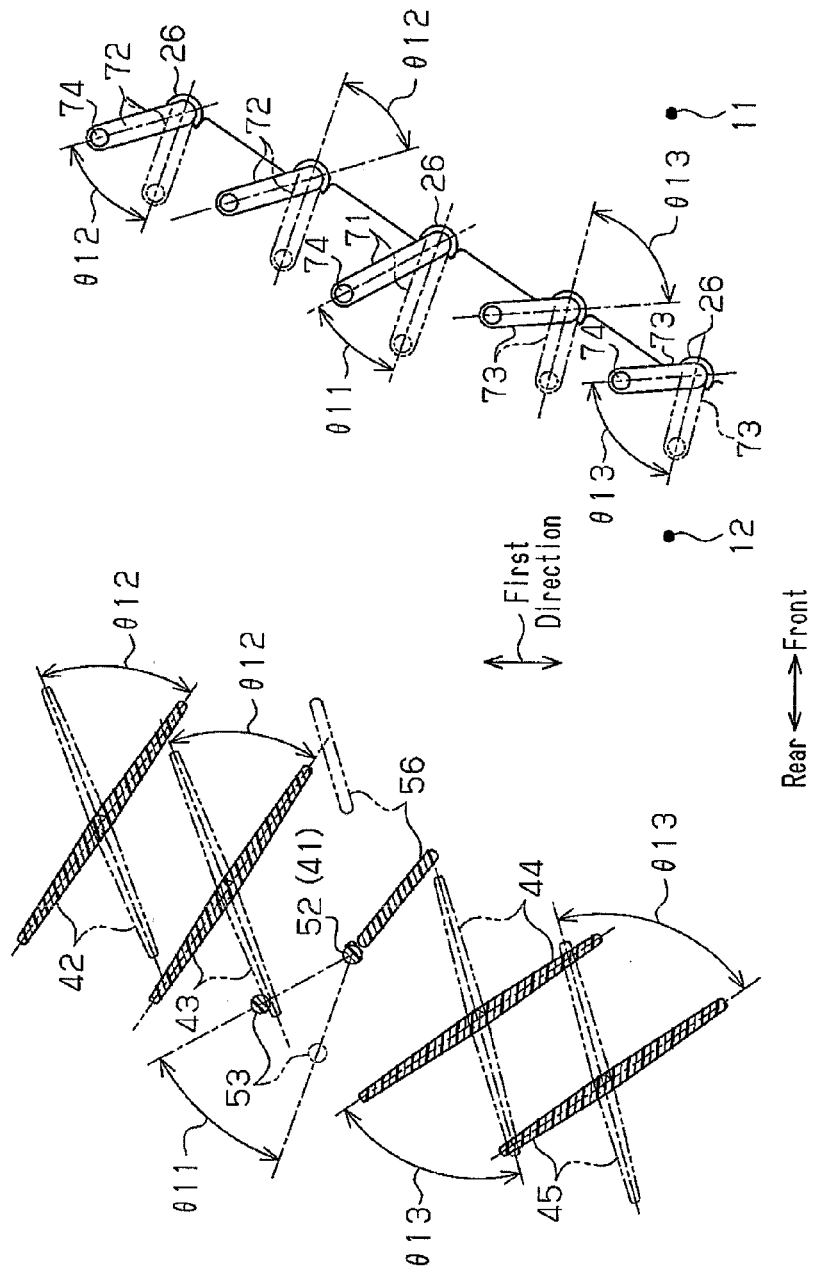

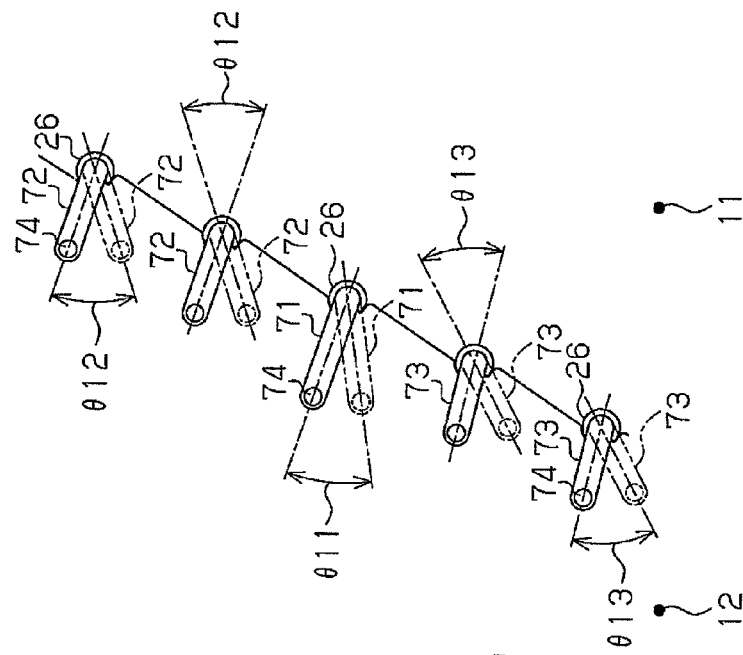
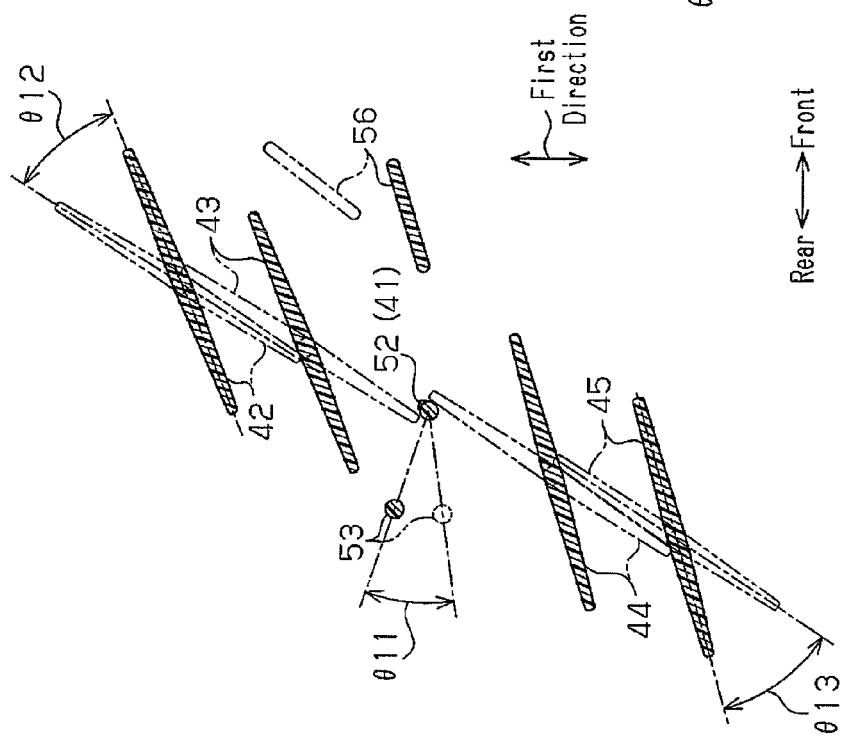

AIR CONDITIONING REGISTER

BACKGROUND OF THE INVENTION

The present invention relates to an air conditioning register, which changes the flow direction of air for air conditioning transmitted from an air conditioner to be blown into a compartment by a plurality of fins and, more particularly, to an air conditioning register that has a structure for selectively opening and closing a ventilation passage by the fins.

For example, Japanese Patent No. 4055693 discloses an air conditioning register for changing the flow direction of air for air conditioning transmitted from an air conditioner blown into a vehicle passenger compartment and that has a structure for selectively opening and closing a ventilation passage by fins.

This air conditioning register includes a case, a plurality of downstream fins, a plurality of upstream fins, and an operation knob. The case has a cylindrical shape, and its inner space constitutes a ventilation passage for the air for air conditioning. Each of the plate-shaped downstream fins has a pivot, and is pivotally supported by the case via the pivot. Each of the plate-shaped upstream fins has a pivot, and is located upstream of the downstream fins. Each of the upstream fins extends in a direction orthogonal to the downstream fins, and is pivotally supported by the case via the pivot. The operation knob is slidably attached onto the downstream fin. In order to transmit sliding operation of the operation knob to the upstream fins, a rack is formed on the operation knob and a pinion that meshes with the rack is formed on the upstream fin.

According to the above-described air conditioning register, the air for air conditioning is blown out of the case after its flow direction is changed along the upstream fins and the downstream fins.

When a force is applied to the operation knob in a thickness direction of the downstream fins, the downstream fins are tilted in the same direction. At this time, the rack tilts together with the downstream fins, and slides along teeth of the pinion. Movement of the rack is not transmitted to the pinion, and therefore, the upstream fins are not tilted. The flow direction of the air for air conditioning is changed along the tilted downstream fins.

When sliding the operation knob along the downstream fins, the rack moves together with the operation knob. Along with the movement of the rack of the operation knob, the rack meshes with the pinion to move the pinion, so that the upstream fins are tilted. When the sliding operation of the operation knob is made along the downstream fins in a normal movable region, the flow direction of the air for air conditioning is changed along the tilted upstream fins. When the sliding operation of the operation knob is made along the downstream fins in a specific movable region that is out of the normal movable region, the upstream fins are almost orthogonal to the ventilation passage. At this time, the ventilation passage is closed by the upstream fins and blowing of the air for air conditioning from the case is blocked.

SUMMARY OF THE INVENTION

When the rack and the pinion are used to transmit the sliding operation of the operation knob to the upstream fins, like the air conditioning register described in Japanese Patent No. 4055693, problems such as an increase in pressure loss and generation of noise may be caused. This is because of the following reasons.

(1) When the rack is employed, the size in a face width direction of the rack (the thickness direction of the downstream fin) increases. This is because, when the operation knob is moved in the thickness direction of the downstream fin to tilt the downstream fins, the meshing between the rack and the pinion needs to be maintained irrespective of the tilting of the downstream fins. This is commonly applicable to cases where the rack is employed, irrespective of whether a structure for selectively opening and closing the ventilation passage by the upstream fins is present or not.

(2) According to the air conditioning register that is structured to close the ventilation passage by the upstream fins, the ventilation passage is closed when the upstream fins are tilted to a greater extent than those of the air conditioning register that is not structured to close the ventilation passage by the upstream fins. Therefore, the size of the rack in a teeth arranging direction (the longitudinal direction of the downstream fins) is increased.

Since the size of the rack increases in the face width direction and in the teeth arranging direction as described above, ventilation resistance by the rack is increased, so that the pressure loss is increased and the generation of noise is caused.

Accordingly, it is an objective of the present invention to provide an air conditioning register capable of suppressing pressure loss and generation of noise caused by a part for transmitting sliding operation of an operation knob to upstream fins.

To achieve the foregoing objective, and in accordance with one aspect of the present invention, an air conditioning register to adjust a flow direction of air for air conditioning is provided. The register includes a case, a plate-shaped downstream fin, a plurality of primary upstream fins, a secondary upstream fin, an operation knob, and a link mechanism. The case has a ventilation passage for the air. The downstream fin has a pivot and is pivotally supported by the case via the pivot. The primary upstream fins are located upstream of the downstream fin in the ventilation passage. Each of the primary upstream fins extends in a direction orthogonal to the downstream fin, includes a pivot, and is pivotally supported by the case via the pivot. The secondary upstream fin is located upstream of the downstream fin in the ventilation passage. The secondary upstream fin includes a pivot, extends in the direction orthogonal to the downstream fin, is pivotally supported by the case via the pivot, and has a shaft extending along the pivot of the secondary upstream fin. The operation knob is slidably attached onto the downstream fin and has a pair of fork portions sandwiching the shaft of the secondary upstream fin. The link mechanism couples the primary upstream fins and the secondary upstream fin to each other. The link mechanism includes a plurality of arms and a coupling rod. Each arm extends from one of the pivot of the primary upstream fins and the secondary upstream fin in a direction orthogonal to the pivot and has a pin formed at a position offset from the pivot. The coupling rod couples all the pins together. The primary upstream fins and the secondary upstream fin are capable of adjusting the flow direction of the air and selectively opening and closing the ventilation passage by tilting. A distance between the pivot and the pin in the arm of the secondary upstream fin is set to be longer than a distance between the pivot and the pin in the arm of each primary upstream fin. The coupling rod includes a plurality of coupling portions each of which couples the pins of each adjacent pair of the arms. Adjacent coupling portions are pivotally coupled.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12A is a cross-sectional side view corresponding to FIG. 6, showing the state where the upstream fins are inclined to increase the dimension toward the downstream side, in the air conditioning register according to the embodiment shown in FIG. 1;

FIG. 12B is a partial side view corresponding to FIG. 4, showing the positional relationship between the upstream fins, the arms and the coupling portions in the state where the upstream fins are inclined to increase the dimension toward the downstream side, in the air conditioning register according to the embodiment shown in FIG. 1;

FIG. 13A is a cross-sectional side view corresponding to FIG. 6, showing the state where the upstream fins are inclined to reduce the dimension toward the downstream side, in the air conditioning register according to the embodiment shown in FIG. 1;

FIG. 13B is a partial side view corresponding to FIG. 4, showing the positional relationship between the upstream fins, the arms and the coupling portions in the state where the upstream fins are inclined to reduce the dimension toward the downstream side, in the air conditioning register according to the embodiment shown in FIG. 1;

FIG. 15A is an explanatory partial cross-sectional view showing tilt ranges of the upstream fins, illustrating the function when the sliding operation of the operation knob is made in a normal movable region according to the embodiment shown in FIG. 1;

FIG. 15B is an explanatory partial side view showing tilt ranges of the arms, illustrating the function when the sliding operation of the operation knob is made in the normal movable region according to the embodiment shown in FIG. 1;

FIG. 16A is an explanatory partial cross-sectional view showing the tilt ranges of the upstream fins, illustrating the function when the sliding operation of the operation knob is made in a specific movable region according to the embodiment shown in FIG. 1;

FIG. 16B is an explanatory partial side view showing the tilt ranges of the arms, illustrating the function when the sliding operation of the operation knob is made in the specific movable region according to the embodiment shown in FIG. 1;

DETAILED DESCRIPTION OF THE PREFERRED EMBODIMENTS

An air conditioning register according to one embodiment of the present invention will now be described with reference to FIG. 1 to FIG. 16B. The air conditioning register is used for vehicles. The air conditioning register has a thin shape of which the horizontal size is smaller than its vertical size.

In the following description, an explanation will be given by defining a travelling direction (a forward movement direction) of the vehicle as the front, a backward movement direction as the rear, and a height direction as a vertical direction. With regard to a vehicle lateral direction (a left-right direction), the right and the left are defined relative to the forward movement direction of the vehicle.

In a passenger compartment, an instrument panel is located in front of the front seats (a driver's seat and a passenger seat) of the vehicle. For example, the instrument panel is equipped with the air conditioning registers of this embodiment at its center portion and both side portions in the vehicle lateral direction. Similarly to a general air conditioning register that is not thin, the air conditioning register of the present embodiment mainly has the function of adjusting a flow direction of air for air conditioning that is transmitted from an air conditioner and blown into the passenger compartment, and the function of selectively permitting and blocking the blowing of the air for air conditioning.

Figure 1:
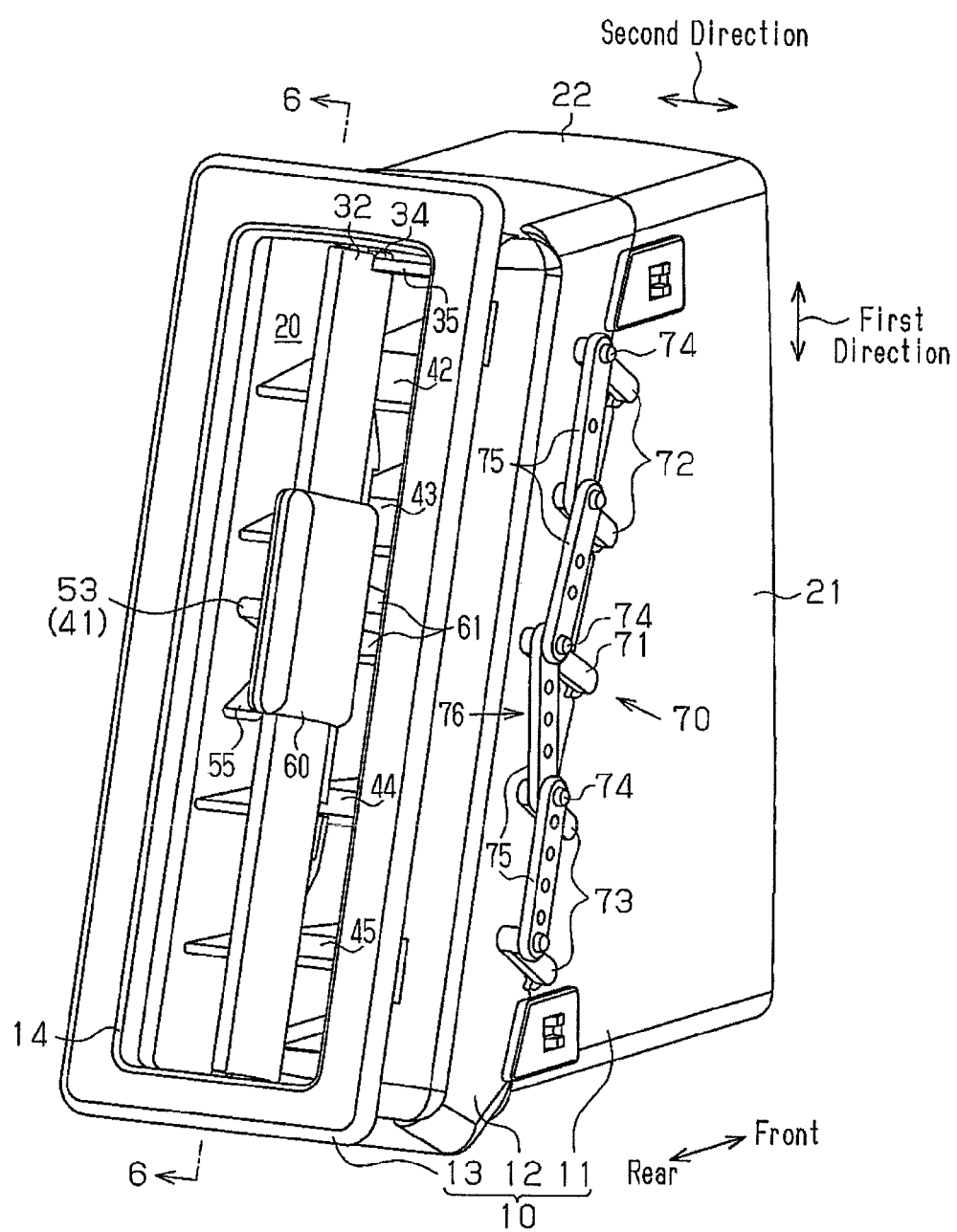
FIG. 1 shows an air conditioning register according to one embodiment of the present invention and is a perspective view showing the state of the air conditioning register when an operation knob is at a reference position in a normal movable region.
Figure 2:
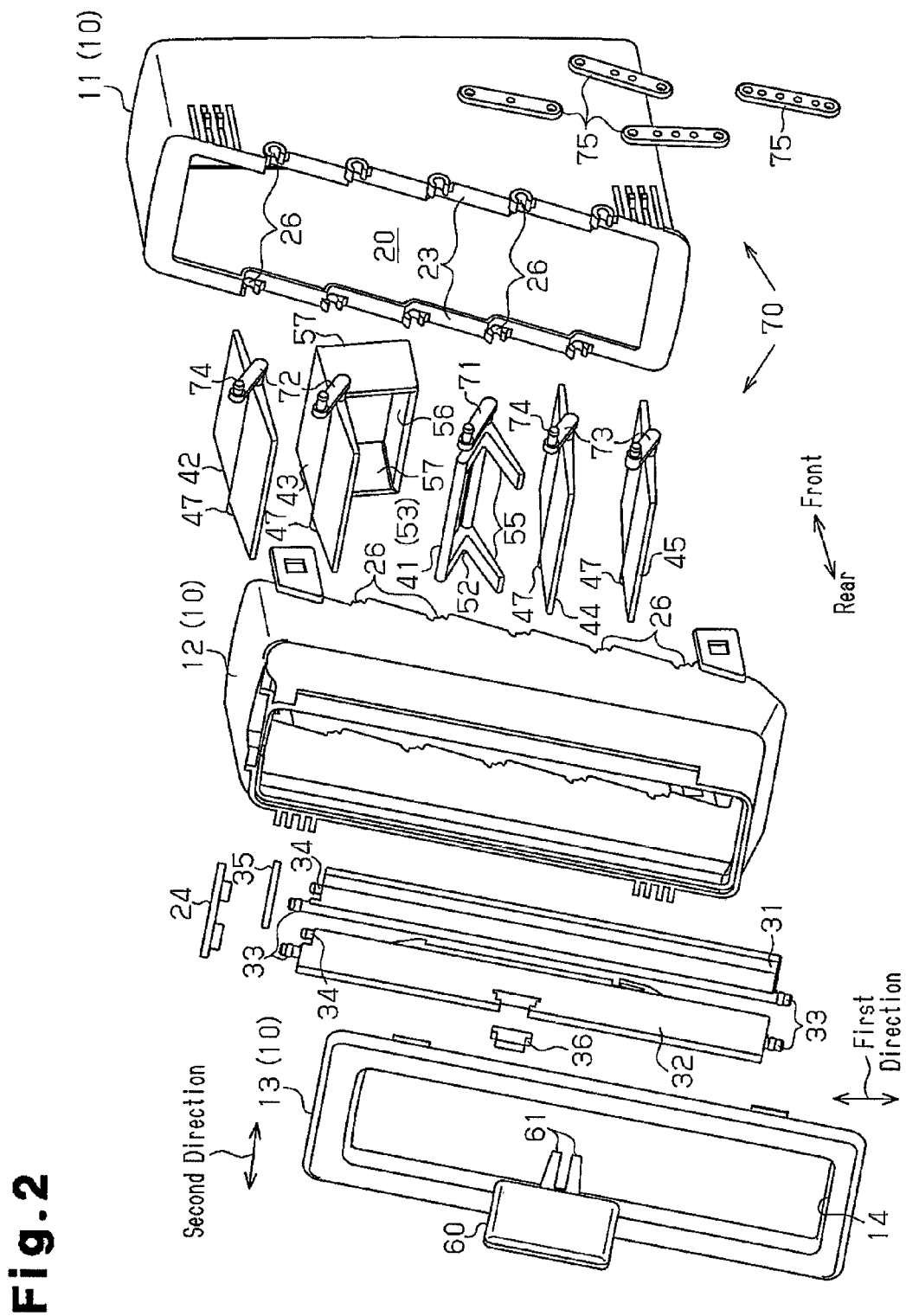
FIG. 2 is an exploded perspective view of the air conditioning register shown in FIG. 1.

As shown in FIGS. 1 and 2, the air conditioning register includes a case 10, a group of downstream fins, a group of upstream fins, an operation knob 60, and a link mechanism 70. Next, respective portions that constitute the air conditioning register will be described.

<Case 10>

The case 10 is formed to cause a ventilation duct (not illustrated) of the air conditioner and an opening (not illustrated) formed in the instrument panel to communicate with each other. The case 10 includes an upstream retainer 11, a downstream retainer 12, and a bezel 13. The case 10 has a rectangular cylindrical shape, of which both ends are open, and the horizontal size is formed to be smaller than its vertical size. Inner space of this case 10 constitutes a flow channel (hereinafter referred to as a "ventilation passage 20") of air for air conditioning A.

On a plane orthogonal to the flow direction of the air for air conditioning A in the ventilation passage 20, one of two directions that are orthogonal to each other is defined as a first direction, and the other is defined as a second direction. According to this embodiment, the vertical direction is defined as the first direction, and the vehicle lateral direction (the left-right direction) is defined as the second direction. The "flow direction" as used herein is defined as a direction in which the air for air conditioning A flows, before the direction of the air for air conditioning A is changed by the group of the downstream fins and the group of the upstream fins. With regard to positional relationship between the respective portions of the air conditioning register, the direction approaching the ventilation passage 20 is defined as an "inward direction" and "inward", and the direction away from the ventilation passage 20 is defined as an "outward direction" and "outward".

The upstream retainer 11 constitutes the most upstream part of the case 10. The downstream retainer 12 is located downstream of the upstream retainer 11. An upstream end of the downstream retainer 12 is coupled to a downstream end of the upstream retainer 11.

The bezel 13 constitutes an ornamental surface of the air conditioning register. The bezel 13 is located at the most downstream part of the case 10 and coupled to a downstream end of the downstream retainer 12. The bezel 13 has the shape of an oblong quadrilateral frame, and has an outlet port 14 for the air for air conditioning A.

The above-described ventilation passage 20 is surrounded by four walls of the case 10. The four walls are formed by a pair of primary walls 21, which are parallel to each other and opposed to each other in the second direction, and a pair of secondary walls 22, which are parallel to each other and opposed to each other in the first direction.

A downstream end of the upper secondary wall 22 is located upstream of a downstream end of the lower secondary wall 22. Therefore, the bezel 13 and the outlet port 14 are inclined relative to the secondary walls 22 so that its lower side protrudes further downstream than its upper side.

Figure 8:
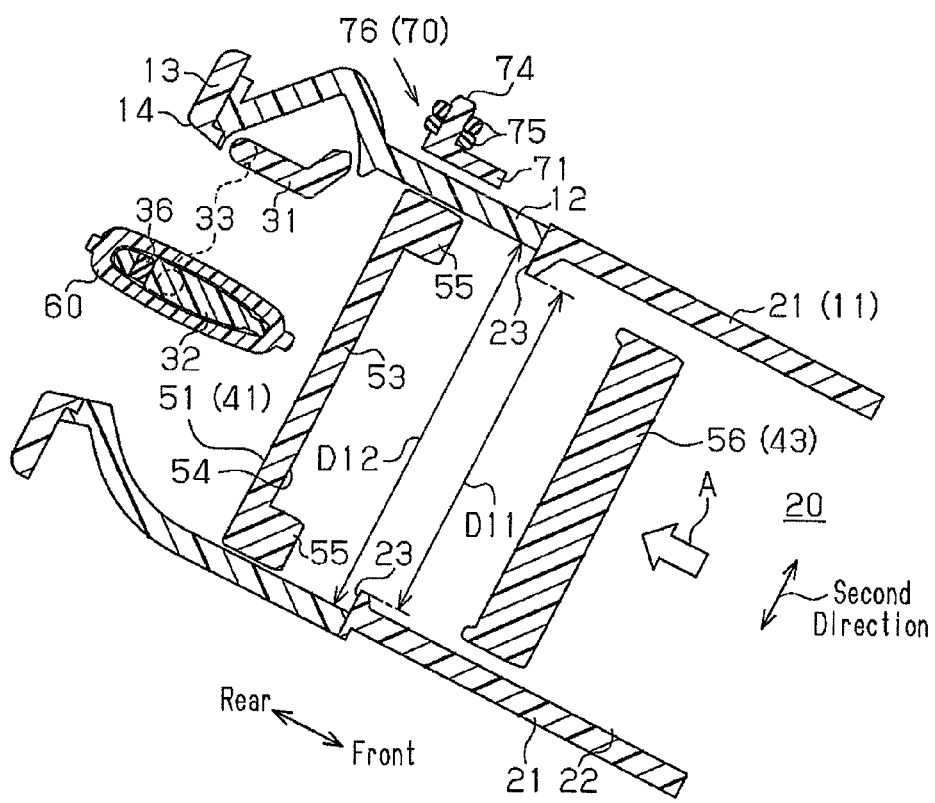
FIG. 8 is a cross-sectional view taken along the 8-8 line in FIG. 6.

As shown in FIG. 8, a space D11 between the primary walls 21 at a downstream end of the upstream retainer 11 is set to be smaller than a space D12 between the primary walls 21 at an upstream end of the downstream retainer 12 (D11<D12). Therefore, each primary wall 21 has a step 23 at a boundary between the upstream retainer 11 and the downstream retainer 12.

Figure 6:
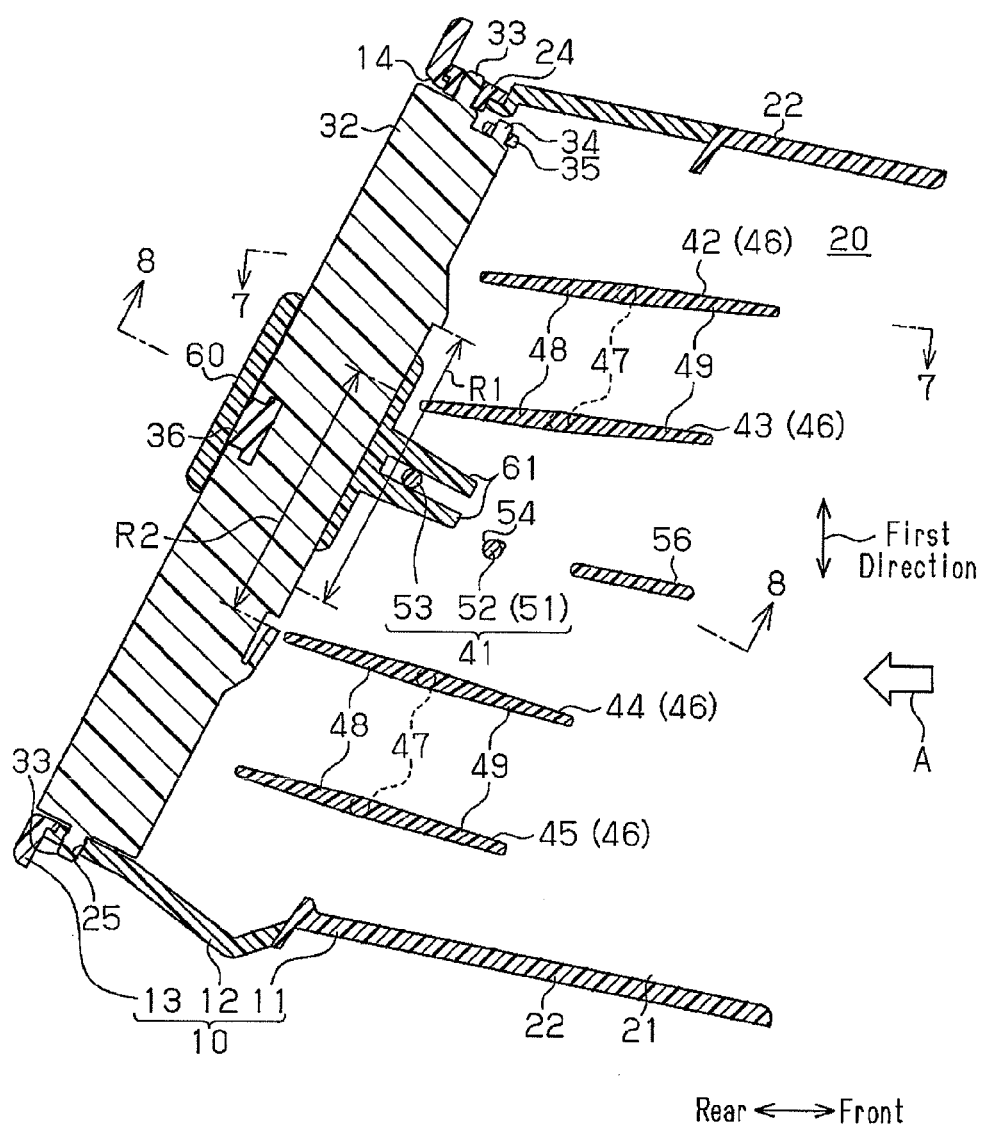
FIG. 6 is a cross-sectional view taken along the 6-6 line in FIG. 1.

As shown in FIGS. 2 and 6, an upper downstream bearing 24 is located on the upper secondary wall 22 at the position slightly separated from the outlet port 14 toward the upstream side. Further, two lower downstream bearings 25 are respectively located on the lower secondary wall 22 at the positions slightly separated from the outlet port 14 toward the upstream side. The lower downstream bearings 25 are respectively located at a center portion in the second direction, and near one of the pair of the primary walls 21 (the right in FIG. 1).

A plurality of upstream bearings 26 are arranged at each primary wall 21. The upstream bearings 26 at each of primary wall 21 are arranged at the boundary between the upstream retainer 11 and the downstream retainer 12 and at the positions separated from each other at approximately regular intervals in the first direction.

<A Group of Downstream Fins>

As shown in FIGS. 2 and 8, the group of the downstream fins is formed by two downstream fins 31 and 32, which extend in the first direction and the flow direction. Each of the downstream fins 31 and 32 has an oblong plate shape, of which the size in the first direction is larger than the size in the flow direction. Each of the downstream fins 31 and 32 has a pair of pivots 33 protruding outwardly from both ends in the first direction. The pivots 33 of the downstream fins 31 and 32 are rotationally supported by the above-described downstream bearings 24 and 25. Thus, the downstream fins 31 and 32 are pivotally supported by the secondary walls 22 so that the downstream ends of the downstream fins 31 and 32 move in the second direction.

As shown in FIGS. 2 and 6, a coupling shaft 34 that extends upward is formed at the position offset from the pivot 33 to the upstream side at an upper portion of each of the downstream fins 31 and 32. The coupling shafts 34 of the downstream fins 31 and 32 are coupled by a downstream coupling rod 35 that has a long shape and extends in the second direction. The downstream fins 31 and 32, the pivots 33, the coupling shafts 34, and the downstream coupling rod 35 constitute a parallel link mechanism, which causes the downstream fin 31 to tilt in synchronization with the downstream fin 32.

An elastic body 36 made of rubber or the like is attached to a center portion in the first direction of the downstream fin 32. The elastic body 36 is brought into contact with the operation knob 60 so as to apply an operation load to the operation knob 60, at the time of sliding operation of the operation knob 60 along the downstream fin 32.

<A Group of Upstream Fins>

The group of the upstream fins is formed by a plurality of (four) primary upstream fins 42, 43, 44 and 45, and one secondary upstream fin 41. The primary upstream fins 42 to 45 and the secondary upstream fin 41 are extended in the second direction and arranged in the first direction with intervals therebetween, on the upstream side of the above-described downstream fins 31 and 32. The secondary upstream fin 41 is located at a center portion in the first direction of the ventilation passage 20. In this specification, the primary upstream fins 42 to 45 and the secondary upstream fin 41 are simply referred to as "upstream fins 41 to 45" when it is not particularly necessary to make a distinction among them.

Each of the primary upstream fins 42 to 45 has, as its main structure, a plate-shaped portion 46, which extends in the second direction and the flow direction. The size of each plate-shaped portion 46 in the second direction is approximately the same as the size in the flow direction.

Figure 7:
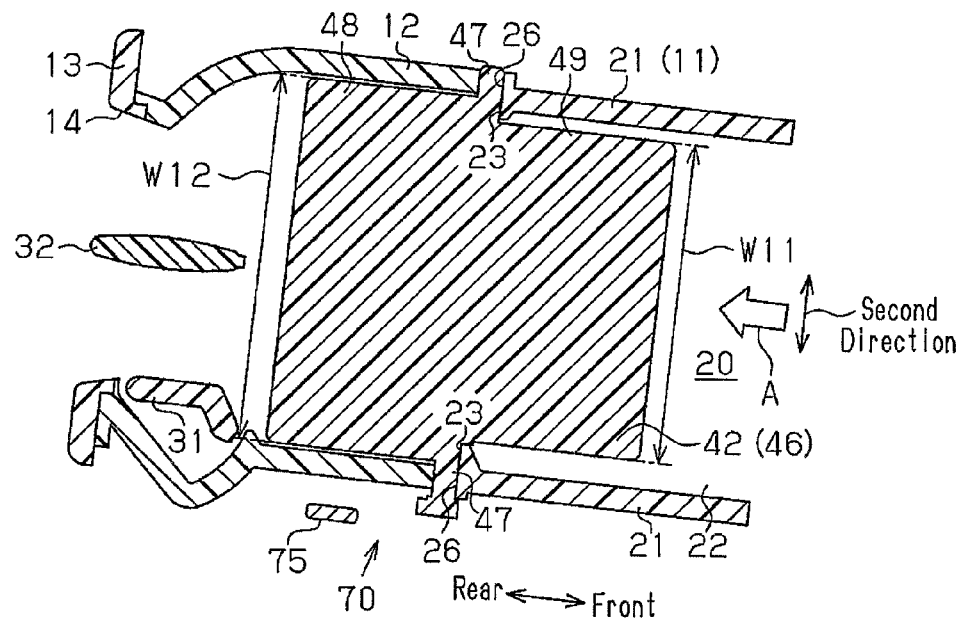
FIG. 7 is a cross-sectional view taken along the 7-7 line in FIG. 6.

A pair of pivots 47 is protruded outwardly in the second direction from both ends in the second direction of each of the plate-shaped portions 46. Each of the pivots 47 is located at a center portion in the flow direction of each of the plate-shaped portions 46. With regard to the size in the second direction of each of the plate-shaped portions 46, as shown in FIG. 7, the downstream side from the pivots 47 is set to have a larger size than that of the upstream side. In each of the plate-shaped portions 46, the section that is located downstream of the pivots 47 is referred to as a wide section 48, and the section that is located upstream of the pivots 47 is referred to as a narrow section 49. A width W12 of the wide section 48 in the second direction is set to be greater than the space D11 between the primary walls 21 at the downstream end of the above-described upstream retainer 11. On the other hand, a width W11 of the narrow section 49 in the second direction is set to be smaller than the above-described space D11. Thereby, when the primary upstream fins 42 to 45 are tilted to the positions to close the ventilation passage 20, the wide sections 48 overlap with the steps 23 from the downstream side (refer to FIG. 11). The pivots 47 of the respective primary upstream fins 42 to 45 are rotationally supported by the above-described upstream bearings 26. Therefore, each of the primary upstream fins 42 to 45 is pivotally supported by the primary walls 21 so that a downstream end of each of the primary upstream fins 42 to 45 moves in the first direction.

Figure 9:
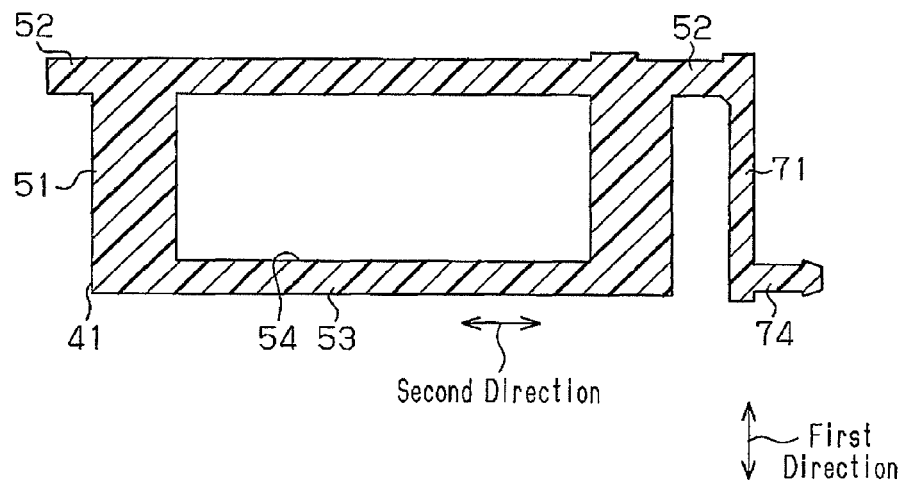
FIG. 9 is a cross-sectional plan view of a secondary upstream fin according to the embodiment shown in FIG. 1.
Figure 11:
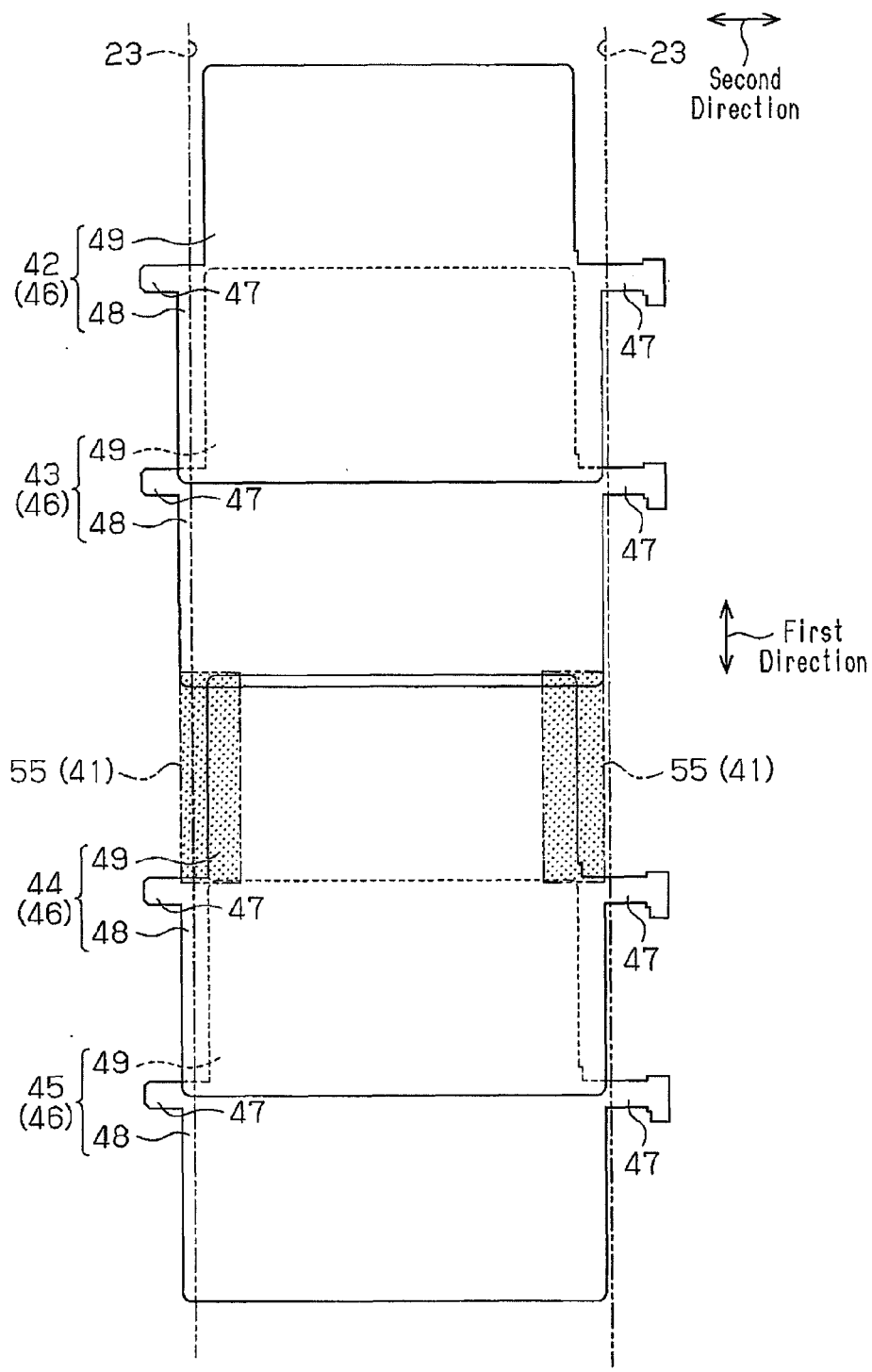
FIG. 11 is an explanatory partial front view showing the overlapping state of the upstream fins when the ventilation passage is closed according to the embodiment shown in FIG. 1.

As shown in FIGS. 6 and 9, the secondary upstream fin 41 is located between a pair of the primary upstream fins 43 and 44 that are located at a center portion in the first direction, out of the above-described plurality of primary upstream fins 42 to 45. A main portion 51 of the secondary upstream fin 41 has such an outside shape that a portion upstream of the pivots 47 (the narrow section 49) is removed from the plate-shaped portion 46 of each of the primary upstream fins 42 to 45 (refer to FIG. 7). The main portion 51 of the secondary upstream fin 41 has pivots 52 at its most upstream part. The above-described main portion 51 has a shaft 53 that extends in the second direction at its most downstream part. The above-described main portion 51 has a hollow 54 between the pivots 52 and the shaft 53. Further, as shown in FIGS. 2 and 11, the secondary upstream fin 41 has a pair of closing plate portions 55 at both side portions in the second direction of the above-described main portion 51. Each of the closing plate portions 55 extends from each pivot 52 toward the downstream side while being inclined to the main portion 51. When the primary upstream fins 42 to 45 are tilted to the positions to close the ventilation passage 20, the closing plate portions 55 are located downstream of the narrow section 49 of the primary upstream fin 44 on the leading side in a tilting direction, so as to fill clearances between the narrow section 49 and the steps 23.

As shown in FIGS. 2 and 6, an auxiliary fin 56 is formed integrally with either one of the pair of the primary upstream fins 43 and 44 that are adjacent to the above-described secondary upstream fin 41 (the primary upstream fin 43 directly above according to this embodiment). The auxiliary fin 56 is located upstream of the pivots 52 of the secondary upstream fin 41 and tilts together with the primary upstream fin 43. The auxiliary fin 56 is formed underneath the narrow section 49 of the primary upstream fin 43 in an almost parallel manner to the narrow section 49. The auxiliary fin 56 is coupled to the narrow section 49 by a pair of coupling plate portions 57 (refer to FIG. 2).

<Operation Knob 60>

The operation knob 60 is operated by a passenger when he/she wishes to adjust the blowing direction of the air for air conditioning A from the outlet port 14. The operation knob 60 is externally fitted onto the above-described downstream fin 32 to be able to slide in the first direction. The operation knob 60 is able to tilt (pivot) together with the downstream fin 32 by using the pivots 33 as a fulcrum, so as to move in the second direction together with a downstream end of the downstream fin 32. Further, the operation knob 60 can be displaced in the first direction by sliding on the downstream fin 32.

A pair of fork portions 61 that extends toward the upstream side is integrally formed with an upstream end of the operation knob 60. The fork portions 61 are separated from each other in the first direction. The interval between the fork portions 61 is set to be slightly larger than the diameter of the shaft 53 of the above-described secondary upstream fin 41. The fork portions 61 transmit the movement (sliding) of the operation knob 60 in the first direction to the secondary upstream fin 41. The fork portions 61 sandwich the shaft 53 of the secondary upstream fin 41 from both sides in the first direction.

The size of the fork portions 61 in the first direction is larger than the diameter of the shaft 53 but smaller than the size of the operation knob 60 in the first direction. The size of the fork portions 61 in the second direction is almost the same as the size of the operation knob 60 in the second direction. The size of the fork portions 61 in the flow direction is set as the size required to sandwich the shaft 53 when the ventilation passage 20 is closed by the primary upstream fins 42 to 45 (the size that prevents the fork portions 61 from being detached from the shaft 53).

Sliding operation of the operation knob 60 can be made in a normal movable region R1 and a specific movable region R2. The normal movable region R1 is the region in which the sliding operation of the operation knob 60 is made in order to tilt the upstream fins 41 to 45 and to adjust the flow direction of the air for air conditioning A. The specific movable region R2 is the region in which the sliding operation of the operation knob 60 is made in order to close the ventilation passage 20 by the upstream fins 41 to 45.

<Link Mechanism 70>

As shown in FIGS. 1 and 2, the link mechanism 70 couples the primary upstream fins 42 to 45 to the secondary upstream fin 41 to be able to transmit power, and causes all the primary upstream fins 42 to 45 to tilt together with the secondary upstream fin 41.

One of the pivots 52 (the right in FIG. 1) of the secondary upstream fin 41 and one of the pivots 47 (the right in FIG. 1) of the respective primary upstream fins 42 to 45 protrude outwardly from the primary wall 21 in the second direction. Elongated arms that extend from the pivots 52 and 47 in a direction orthogonal to the pivots 52 and 47 are formed at outer end portions of the respective pivots 52 and 47. In order to distinguish between the arms of the respective upstream fins 41 to 45, the arm of the secondary upstream fin 41 is designated with reference number 71. Further, the arms of the primary upstream fins 42 and 43 that are located above the secondary upstream fin 41 are designated with reference number 72, and the arms of the primary upstream fins 44 and 45 that are located below the secondary upstream fin 41 are designated with reference number 73.

Figure 3:
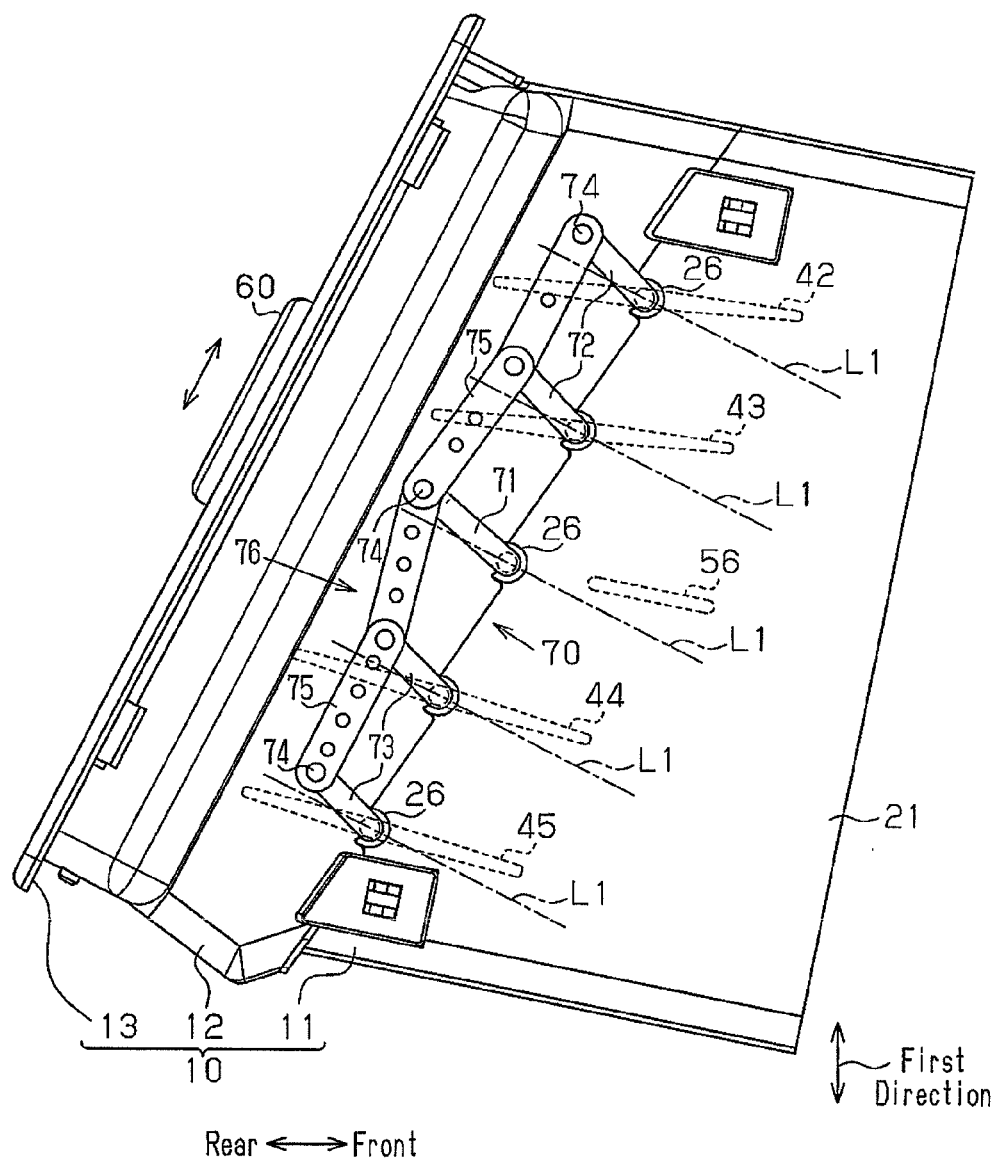
FIG. 3 is a side view of the air conditioning register shown in FIG. 1.
Figure 4:
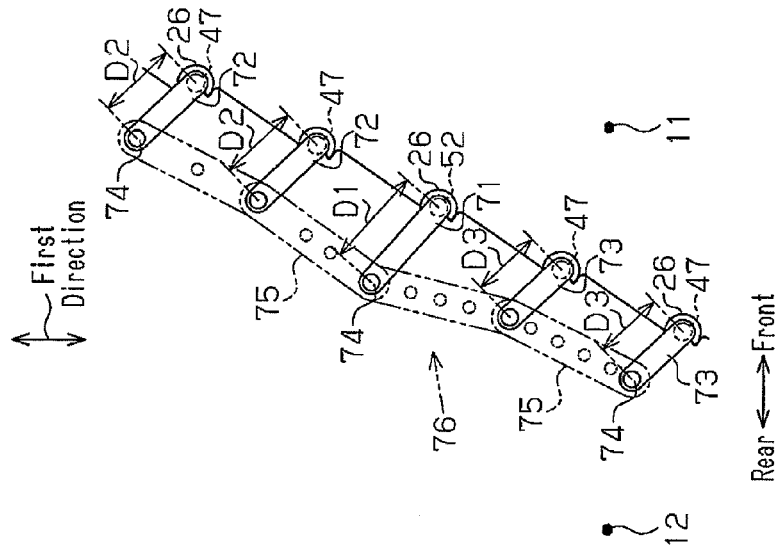
FIG. 4 is a partial side view showing positional relationship between upstream fins, arms, and coupling portions in FIG. 3.

As shown in FIGS. 3 and 4, the respective arms 71 to 73 are inclined to increase the dimension toward the downstream side, when the respective primary upstream fins 42 to 45 are tilted almost horizontally. Angles formed by the respective arms 71 to 73 relative to a line L1 that is orthogonal to the outlet port 14 are respectively referred to as θ1, θ2 and θ3. The angle θ2 of the arms 72 and the angle θ3 of the arms 73 are almost identical to each other, and the angle θ1 of the arm 71 is set to be smaller than the angles θ2 and θ3 of the arms 72 and 73.

Further, the arms 73 are formed to be shorter than the arms 72, and the arm 71 is formed to be longer than the arms 72.

Figure 5:
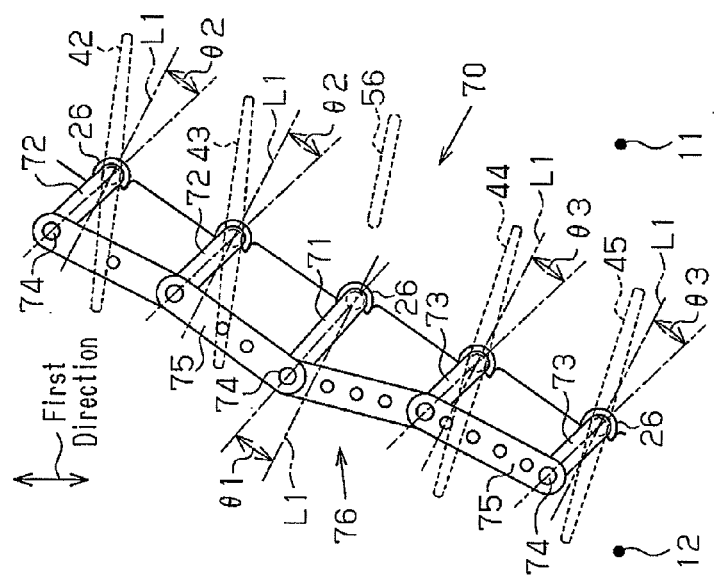
FIG. 5 is a side view showing distances between pivots and pins in the respective arms in FIG. 3.

As shown in FIGS. 2 and 5, pins 74 are protruded outwardly in the second direction from downstream ends of the respective arms 71 to 73. Supposing that the distance between the pivot 52 and the pin 74 in the arm 71 is D1, the distances between the pivots 47 and the pins 74 in the arms 72 are D2, and the distances between the pivots 47 and the pins 74 in the arms 73 are D3, the respective distances D1 to D3 are set such that the relationship of D1>D2>D3 is established according to this embodiment.

Each adjacent pair of the pins 74 of the five arms 71 to 73 are coupled to each other by coupling portions 75, each having an elongated plate shape. Each adjacent pair of the coupling portions 75 is rotationally engaged with one of the pins 74 at different positions in the longitudinal direction of the pin 74 (refer to FIG. 8). The above-described coupling portions 75 constitute a coupling rod 76, which couples all the pins 74 together. With this coupling rod 76, adjacent coupling portions 75 are pivotally coupled to each other via the common pin 74.

The air conditioning register of this embodiment is formed as described above. Next, operation of this air conditioning register will be described.

According to this air conditioning register, as shown in FIGS. 1 and 6, the air for air conditioning A is blown out of the outlet port 14 of the case 10 after its flow direction is changed along the primary upstream fins 42 to 45 and the downstream fins 31 and 32.

In general, the parts located inside the case 10 of the air conditioning register may be the factors that reduce an effective opening area of the outlet port 14. The effective opening area is the area where the respective parts are not projected on a plane orthogonal to the flow direction of the air for air conditioning A at the outlet port 14. The part to transmit the movement of the operation knob 60 to the secondary upstream fin 41 may be one of the factors that reduce the effective opening area. When the effective opening area is reduced, ventilation resistance is increased, pressure loss is increased, and noise is generated. Therefore, it is important to reduce the area where the parts inside the case 10 are projected (a projection area) on the plane that is orthogonal to the flow direction of the air for air conditioning A at the outlet port 14, in order to suppress the pressure loss and the noise.

In this respect, according to the air conditioning register of this embodiment, the movement of the operation knob 60 in the first direction is transmitted to the secondary upstream fin 41 by the pair of the fork portions 61, which sandwich the shaft 53. The fork portions 61 are formed to simply sandwich the shaft 53, and its sizes in the longitudinal direction of the downstream fin 32 and in the thickness direction are smaller than the sizes of the rack described in the Japanese Patent No. 4055693. Therefore, the projection area of the fork portions 61 is smaller than the projection area of the rack described in the Japanese Patent No. 4055693, and the effective opening area is reduced by a smaller extent by the fork portions 61. Resistance (ventilation resistance) of the fork portions 61 when the air for air conditioning A passes through the ventilation passage 20 is reduced.

When a force is applied to a downstream end of the above-described operation knob 60 in the thickness direction of the downstream fin 32, the downstream fin 32 is tilted to the same direction by using the pivots 33 as the fulcrum. The tilt of the downstream fin 32 is transmitted to the coupling shaft 34 of the downstream fin 31 via the coupling shaft 34 and the downstream coupling rod 35. This transmission causes the downstream fin 31 to tilt to the same direction together with the above-described downstream fin 32.

At this time, the fork portions 61 move along the shaft 53 while sandwiching the shaft 53 of the secondary upstream fin 41. Therefore, the movement of the fork portions 61 is not transmitted to the shaft 53. Consequently, the secondary upstream fin 41 and all the primary upstream fins 42 to 45 are not tilted. The flow direction in the second direction of the air for air conditioning A is changed to flow along the tilted downstream fins 31 and 32.

Next, operation when the sliding operation of the operation knob 60 is made along the downstream fin 32 in the longitudinal direction of the downstream fin 32 will be described for (i) the case where the sliding operation of the operation knob 60 is made in the normal movable region R1, and (ii) the case where the sliding operation of the operation knob 60 is made in the specific movable region R2.

(i) The Case where the Sliding Operation of the Operation Knob 60 is Made in the Normal Movable Region R1

FIGS. 3 and 6 show the state of the air conditioning register in which the operation knob 60 is located at a center portion of the normal movable region R1. The position of the operation knob 60 at this time is referred to as a "reference position". When the operation knob 60 is located at the reference position, the primary upstream fins 42 to 45 are respectively arranged almost horizontally (in an almost parallel manner to both secondary walls 22). The positions of the respective primary upstream fins 42 to 45 at this time are referred to as "neutral positions". The auxiliary fin 56 is arranged almost horizontally at the position separated from the pivots 52 of the secondary upstream fin 41 toward the upstream side. Thus, the air for air conditioning A flows in an almost horizontal direction along the primary upstream fins 42 to 45, the auxiliary fin 56, and the secondary walls 22.

At this time, the arms 71 to 73 of the respective upstream fins 41 to 45 are inclined to increase the dimension toward the downstream side. The arms 72 and 73 of the primary upstream fins 42 to 45 are tilted to a greater extent than the arm 71 of the secondary upstream fin 41.

FIGS. 12A and 12B show the state of the air conditioning register in which the sliding operation of the operation knob 60 is made from the reference position toward the upper side.

Along with the above-described sliding operation of the operation knob 60, the fork portions 61 are moved upwardly. The fork portion 61 on the trailing side in a moving direction (below) is brought into contact with the shaft 53 of the secondary upstream fin 41, and presses the shaft 53 upwardly. Along with the upward movement of the fork portion 61, the position of contact between the shaft 53 and the fork portion 61 changes in the flow direction, and the secondary upstream fin 41 is allowed to tilt upwardly by using the pivots 52 as the fulcrum. Thus, upward linear movement of the operation knob 60 is converted to upward tilting movement (rotating movement) of the secondary upstream fin 41 by using the pivots 52 as the fulcrum.

The above-described tilt of the secondary upstream fin 41 is transmitted to all the primary upstream fins 42 to 45 via the link mechanism 70. Namely, along with the above-described upward tilt of the secondary upstream fin 41, the arm 71 tilts upwardly by using the pivot 52 as the fulcrum, and the pin 74 pivots upwardly around the pivot 52. The coupling portions 75 that are adjacent to each other via the arm 71 and that make up a pair are able to pivot around the pin 74 of the arm 71, respectively, and to change the angle formed by the coupling portions 75. Thus, the movement of the pin 74 of the secondary upstream fin 41 (the arm 71) (the upward pivot around the pivot 52) is transmitted to the adjacent pins 74 of the primary upstream fins 43 and 44 (the arms 72 and 73) via the coupling portions 75. According to this embodiment, other primary upstream fins 42 and 45 are arranged next to the above-described primary upstream fins 43 and 44. Therefore, the above-described movement of the pins 74 of the primary upstream fins 43 and 44 located at the positions closer to the secondary upstream fin 41 is transmitted to the pins 74 of the primary upstream fins 42 and 45 (the arms 72 and 73) located at the positions separated from the secondary upstream fin 41, via the coupling portions 75.

Thus, the movement of the pin 74 of the secondary upstream fin 41 (the arm 71) is transmitted to the pins 74 of all the primary upstream fins 42 to 45 (the arms 72 and 73) via the coupling portions 75. The pins 74 of the respective primary upstream fins 42 to 45 (the arms 72 and 73) pivot upwardly around the respective pivots 47. This pivot causes the respective arms 71 to 73 to tilt sharply. The angles θ1, θ2 and θ3, which are formed by the respective arms 71 to 73 relative to the line L1, are greater than those of when the operation knob 60 is at the reference position (when the primary upstream fins 42 to 45 are at the neutral positions) (refer to FIG. 4).

As a result of this, all the primary upstream fins 42 to 45 are tilted upwardly by using the pivots 47 as the fulcrums, together with the secondary upstream fin 41, and are inclined to increase the dimension toward the downstream side. The auxiliary fin 56 is inclined to increase its dimension toward the downstream side at the position close to the pivots 52 from the upstream side. Since the air for air conditioning A flows along the above-described primary upstream fins 42 to 45 and auxiliary fin 56, the flow direction of the air for air conditioning A can be changed to a diagonally upward direction.

As shown in FIG. 5, the distances D1, D2 and D3 between the pivots 52 and 47 and the pins 74 of the respective arms 71 to 73 have the relationship of D1>D2>D3. For this reason, all the primary upstream fins 42 to 45 are tilted to a greater extent than the secondary upstream fin 41. Further, from the above-described relationship, the primary upstream fins 44 and 45 that are below the secondary upstream fin 41 are tilted to a greater extent than the primary upstream fins 42 and 43, which are located above. As shown in FIG. 12B, the angle θ1 of the arm 71 is smaller than the angle θ2 of the arm 72 (θ1<θ2) and the angle θ2 of the arm 72 is smaller than the angle θ3 of the arm 73 (θ2<θ3).

Therefore, as shown in FIG. 12A, the air for air conditioning A flowing along the primary upstream fins 44 and 45, which are below the secondary upstream fin 41, is allowed to flow closer to the air for air conditioning A flowing along the primary upstream fins 42 and 43, which are above the secondary upstream fin 41. Thus, the air for air conditioning A is converged, and directivity of the air for air conditioning A is improved.

Meanwhile, FIGS. 13A and 13B show the state of the air conditioning register in which the sliding operation of the operation knob 60 is made downwardly from the above-described reference position (refer to FIG. 6), contrary to FIGS. 12A and 12B.

Along with the above-described sliding operation of the operation knob 60, the fork portions 61 are moved downwardly. The fork portion 61 on the trailing side in the moving direction (above) presses the shaft 53 of the secondary upstream fin 41 downwardly. Along with the downward movement of the fork portion 61, the position of contact between the shaft 53 and the fork portion 61 changes in the flow direction, and the secondary upstream fin 41 is allowed to tilt downwardly by using the pivots 52 as the fulcrum.

Along with the above-described tilt of the secondary upstream fin 41, the arm 71 tilts downwardly by using the pivot 52 as the fulcrum, and the pin 74 pivots around the pivot 52 downwardly. The coupling portions 75 that are adjacent to each other via the arm 71 pivot around the pin 74 of the arm 71, respectively, and change the angle formed by the coupling portions 75. Thus, the movement of the pin 74 of the secondary upstream fin 41 (the arm 71) (the downward pivot around the pivot 52) is transmitted to the adjacent pins 74 of the primary upstream fins 43 and 44 (the arms 72 and 73) via the coupling portions 75. The movement of the pins 74 of the primary upstream fins 43 and 44 located at the positions closer to the secondary upstream fin 41 is transmitted to the pins 74 of the primary upstream fins 42 and 45 (the arms 72 and 73) located at the positions separated from the secondary upstream fin 41, via the coupling portions 75.

Thus, the movement of the pin 74 of the secondary upstream fin 41 (the arm 71) is transmitted to the pins 74 of all the primary upstream fins 42 to 45 (the arms 72 and 73) via the coupling portions 75. The pins 74 of the respective primary upstream fins 42 to 45 (the arms 72 and 73) pivot downwardly around the respective pivots 47, so as to cause the respective arms 71 to 73 to tilt gently. The angles θ1, θ2 and θ3, which are formed by the respective arms 71 to 73 relative to the line L1, are smaller than those of when the above-described operation knob 60 is located at the reference position (the primary upstream fins 42 to 45 are at the neutral positions) (refer to FIG. 4).

As a result of this, all the primary upstream fins 42 to 45 are tilted downwardly by using the pivots 47 as the fulcrums, together with the secondary upstream fin 41, and are inclined to reduce the dimension toward the downstream side. The auxiliary fin 56 is inclined to reduce its dimension toward the downstream side at the position separated from the pivot 52 toward the upstream side. Since the air for air conditioning A flows along the above-described primary upstream fins 42 to 45 and auxiliary fin 56, the flow direction of the air for air conditioning A can be changed to a diagonally downward direction.

As described above, the distances D1, D2 and D3 between the pivots 52 and 47 and the pins 74 have the relationship of D1>D2>D3. For this reason, all the primary upstream fins 42 to 45 are tilted to a greater extent than the secondary upstream fin 41. Further, the primary upstream fins 44 and 45, which are located below the secondary upstream fin 41, are tilted to a greater extent than the primary upstream fins 42 and 43, which are located above. As shown in FIG. 13B, the angle θ1 of the arm 71 is smaller than the angle θ2 of the arm 72 (θ1<θ2) and the angle θ2 of the arm 72 is smaller than the angle θ3 of the arm 73 (θ2<θ3).

FIG. 15B shows tilt ranges of the arms 71 to 73 when the above-described sliding operation of the operation knob 60 is made in the normal movable region R1. Further, FIG. 15A shows tilt ranges of the primary upstream fins 42 to 45 when the sliding operation of the operation knob 60 is made in the normal movable region R1. A tilt angle of the secondary upstream fin 41 and the arm 71 in the above-described tilt range is defined as θ11. A tilt angle of the primary upstream fins 42 and 43 and the arms 72 in the above-described tilt ranges is defined as θ12, and a tilt angle of the primary upstream fins 44 and 45 and the arms 73 in the above-described tilt ranges is defined as θ13. In this case, the relationship of θ11<θ12<θ13 is established between the tilt angles θ11 to θ13.

Supposing that there is a region exposed to the air for air conditioning A on the secondary upstream fin 41 when the sliding operation of the operation knob 60 is made in the normal movable region R1 and the upstream fins 41 to 45 are tilted as shown in FIGS. 12A and 13A, the air for air conditioning A flows along the region. The angle θ1 of the secondary upstream fin 41 is smaller than the angle θ2 of the primary upstream fins 42 and 43 above and the angle θ3 of the primary upstream fins 44 and 45 below. For this reason, the air for air conditioning A flowing along the secondary upstream fin 41 may be interfered with and disturbed by the air for air conditioning A flowing along the primary upstream fins 42 to 45.

According to the secondary upstream fin 41, however, the pivots 52 are located at the most upstream part, and the main portion 51 of the secondary upstream fin 41 is located on the downstream side of the pivots 52 only. The secondary upstream fin 41 has a small number of parts acting on the flow direction of the air for air conditioning A. For this reason, it is less likely that the flow direction of the air for air conditioning A that flows near the secondary upstream fin 41 is changed to a direction different from the direction of the air for air conditioning A that flows near the primary upstream fins 42 to 45.

Further, in the main portion 51 of the secondary upstream fin 41, the hollow 54 is formed between the pivots 52 located at the most upstream part and the shaft 53 located downstream of the pivots 52. Thereby, the main portion 51 has the smaller number of parts acting in the flow direction of the air for air conditioning A. For this reason, it is even less likely that the flow direction of the air for air conditioning A that flows near the secondary upstream fin 41 is changed to the direction different from the direction of the air for air conditioning A that flows near the primary upstream fins 42 to 45.

Further, the secondary upstream fin 41 is not provided with a structure for positively changing the flow direction of the air for air conditioning A, as described above. Therefore, it is difficult to appropriately change the flow direction of the air for air conditioning A flowing near the secondary upstream fin 41, when there is only the secondary upstream fin 41. There is such possibilities that the flow direction of the air for air conditioning A passing though the space between the primary upstream fins 43 and 44, which are on both sides of the secondary upstream fin 41, is not changed, and the air for air conditioning A is blown straight from the outlet port 14 to the downstream side.

However, the primary upstream fin 43 is tilted together with the auxiliary fin 56. The air for air conditioning A, of which the flow direction is changed along the auxiliary fin 56, passes through the secondary upstream fin 41. For this reason, the flow direction of the air for air conditioning A flowing near the secondary upstream fin 41 is changed to the approximately same direction as that of the air for air conditioning A flowing near the primary upstream fins 42 to 45.

(ii) the Case where the Sliding Operation of the Operation Knob 60 is Made in the Specific Movable Region R2

In this case, the link mechanism 70 operates in a basically similar manner to the case where the sliding operation of the operation knob 60 is made in the normal movable region R1 as described above. FIG. 16B shows the tilt ranges of the arms 71 to 73, and FIG. 16A shows the tilt ranges of the primary upstream fins 42 to 45, respectively, when the sliding operation of the operation knob 60 is made in the specific movable region R2.

Figure 10:
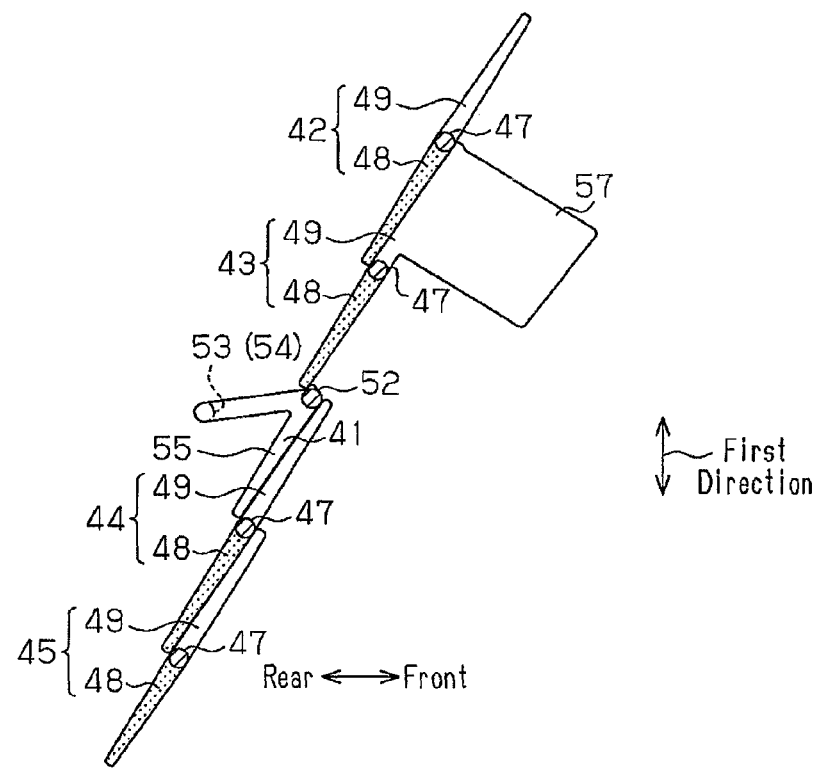
FIG. 10 is an explanatory partial side view showing an overlapping state of upstream fins when a ventilation passage is closed according to the embodiment shown in FIG. 1.
Figure 14A:
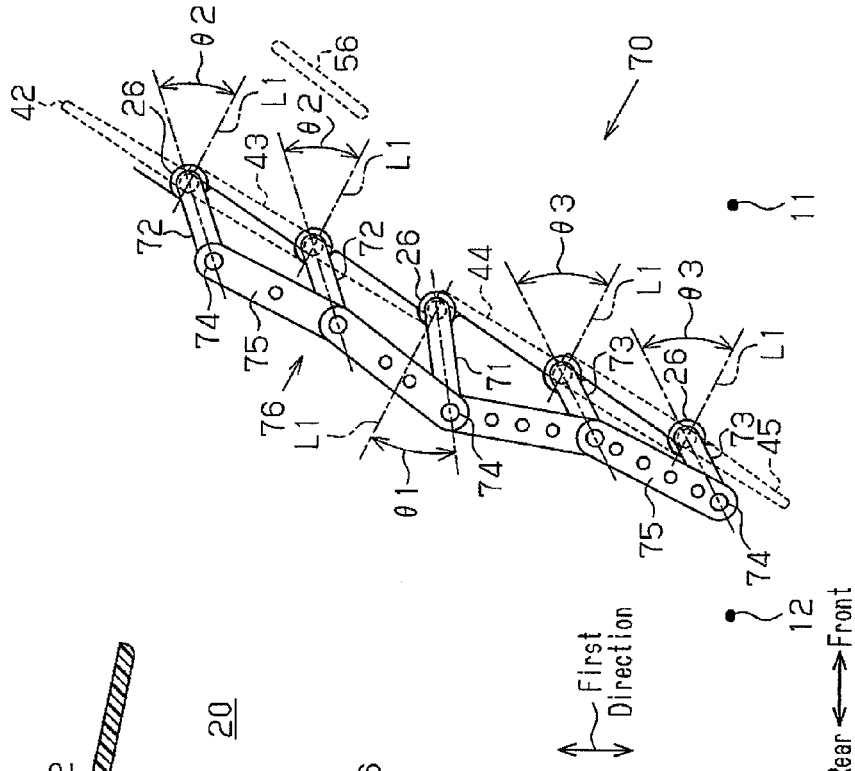
FIG. 14A is a cross-sectional side view corresponding to FIG. 6, showing the state where the ventilation passage is closed by the upstream fins in the air conditioning register according to the embodiment shown in FIG. 1.
Figure 14B:
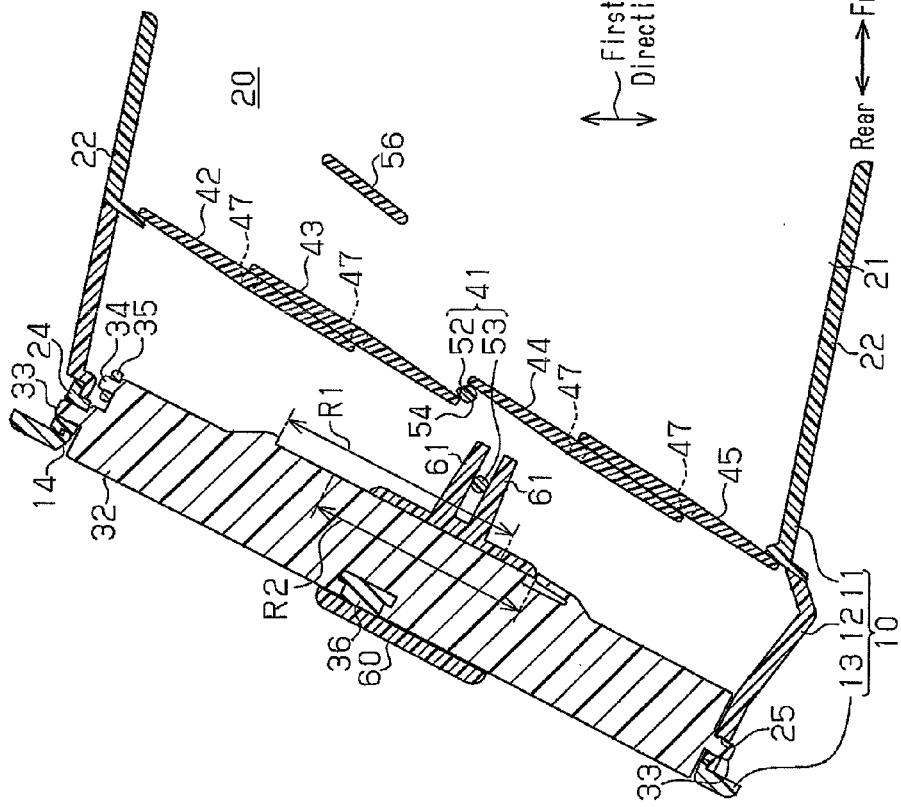
FIG. 14B is a partial side view corresponding to FIG. 4, showing the positional relationship between the upstream fins, the arms and the coupling portions in the state where the ventilation passage is closed by the upstream fins in the air conditioning register according to the embodiment shown in FIG. 1.

When the sliding operation of the operation knob 60 is made to a lower end of the specific movable region R2, the air conditioning register reaches the state as shown in FIG. 10, FIGS. 14A and 14B. Under this state, the upstream fins 41 to 45 are tilted almost orthogonally to the flow direction.

The wide section 48 of the primary upstream fin 42 on the trailing side in the tilting direction overlaps with the narrow section 49 of the primary upstream fin 43 on the leading side in the tilting direction from the downstream side. Further, the wide section 48 of the primary upstream fin 44 on the trailing side in the tilting direction overlaps with the narrow section 49 of the primary upstream fin 45 on the leading side in the tilting direction from the downstream side. Since the wide sections 48 overlap with the narrow sections 49 like this, the ventilation passage 20 is almost closed by all the primary upstream fins 42 to 45, and the blowing of the air for air conditioning A from the outlet port 14 is substantially limited.

It is supposed that the distance D1 between the pivot 52 and the pin 74 in the arm 71 is set to be identical to or shorter than the distances D2 and D3 between the pivots 47 and the pins 74 in the arms 72 and 73. In this case, it is necessary to tilt the secondary upstream fin 41 to a great extent, similarly to the primary upstream fins 42 to 45, when the sliding operation of the operation knob 60 is made in the specific movable region R2. At this time, however, efficiency of converting the linear movement of the fork portions 61 to the tilting movement of the secondary upstream fin 41 decreases as the secondary upstream fin 41 is tilted to close the ventilation passage 20. Specifically, a force to press the shaft 53 against the pivots 52 becomes stronger than a force to pivot the shaft 53 around the pivots 52. As a result of this, it is necessary to apply a large force to the shaft 53 via the fork portions 61 in order to cause the secondary upstream fin 41 to tilt. Therefore, a large operation load is required to make the sliding operation of the operation knob 60.

However, according to this embodiment in which the distance D1 is set to be longer than the distances D2 and D3, as shown in FIG. 5, the secondary upstream fin 41 and the arm 71 are tilted at an angle smaller than the angles of the primary upstream fins 42 to 45 and the arms 72 and 73, as shown in FIGS. 16A and 16B. More specifically, the relationship of θ11<θ12<θ13 is established between the tilt angles θ11 to θ13. Therefore, when the secondary upstream fin 41 and the arm 71 are tilted by the small tilt angle θ11, the primary upstream fins 42 to 45 and the arms 72 and 73 are tilted at the large angles, so that the ventilation passage 20 is closed. As a result of this, the operation load required to make the sliding operation of the operation knob 60 in the specific movable region R2 is reduced. This reduces the difference in the operation loads, between the case where the sliding movement of the operation knob 60 is made in the normal movable region R1 and the case where the sliding operation is made in the specific movable region R2.

When the respective primary upstream fins 42 to 45 are almost orthogonal to the flow direction, the wide sections 48 of the respective plate-shaped portions 46 overlap with the steps 23 from the downstream side as shown in FIG. 11, and the clearances between the steps 23 and the plate-shaped portions 46 are small. For this reason, it is less likely that the air for air conditioning A passes through the space between the wide sections 48 and the steps 23.

The clearances are generated between the narrow sections 49 of the respective plate-shaped portions 46 and the steps 23. However, the wide sections 48 of the primary upstream fins 42 to 45 on the trailing side in the tilting direction overlap with the narrow sections 49 of the primary upstream fins 42 to 45 on the leading side in the tilting direction. Therefore, it is less likely that the air for air conditioning A flows to the downstream side through the above-described clearances.

However, the secondary upstream fin 41 does not have a section corresponding to the wide sections 48 of the primary upstream fins 42 to 45. Therefore, there is a possibility that the air for air conditioning A passes through the clearances between the narrow section 49 of the plate-shaped portion 46 of the primary upstream fin 44 and the steps 23.

According to this embodiment, the closing plate portions 55 are respectively formed at both side portions in the second direction of the main portion 51 of the secondary upstream fin 41. When the primary upstream fins 42 to 45 are tilted to the positions to close the ventilation passage 20, both closing plate portions 55 are located downstream of the narrow section 49 of the primary upstream fin 44 on the leading side in the tilting direction, so as to fill the above-described clearances between the narrow section 49 and the steps 23. Thus, it is less likely that the air for air conditioning A passes through the above-described clearances.

The following advantages are obtained according to this embodiment as described in detail thus far.

(1) The air conditioning register includes the case 10, the downstream fins 31 and 32, the primary upstream fins 42 to 45, the secondary upstream fin 41, the operation knob 60, and the link mechanism 70. The link mechanism 70 includes the arms 71 to 73, which extend from the pivots 52 and 47 of the respective upstream fins 41 to 45 in the direction orthogonal to the pivots 52 and 47 and have the pins 74 at positions offset from the pivots 52 and 47, and the coupling rod 76, which couples all the pins 74. The operation knob 60 is slidably arranged on the downstream fin 32, and has the pair of the fork portions 61 for sandwiching the shaft 53 of the secondary upstream fin 41 (FIGS. 1 and 2).

Since the part (the fork portions 61) for transmitting the sliding operation of the operation knob 60 to the secondary upstream fin 41 is small, it is possible to suppress the pressure loss and the generation of noise caused by the part.

(2) The distance D1 between the pivot 52 and the pin 74 in the arm 71 of the secondary upstream fin 41 is set to be longer than the distances D2 and D3 between the pivots 47 and the pins 74 in the arms 72 and 73 of the primary upstream fins 42 to 45 (FIGS. 4 and 5).

Thus, the tilt angle θ11 of the secondary upstream fin 41 and the arm 71 is made smaller than the tilt angles θ12 and θ13 of the primary upstream fins 42 to 45 (the arms 72 and 73) (FIGS. 16A and 16B), so that the operation load required to make the sliding operation of the operation knob 60 in the specific movable region R2 can be reduced.

(3) The distance D1 in the arm 71 of the secondary upstream fin 41 is different from the distances D2 and D3 in the arms 72 and 73 of the primary upstream fins 42 to 45. In order to cause the secondary upstream fin 41 and the primary upstream fins 42 to 45 to tilt, the angles formed by each adjacent pair of the coupling portions 75 need to be changed.

In this regard, adjacent coupling portions 75 in the coupling rod 76 are pivotally coupled to each other according to this embodiment (FIGS. 4 and 5).

Therefore, it is possible to cause the secondary upstream fin 41 and the primary upstream fins 42 to 45 to tilt by bending adjacent pairs of the coupling portions 75 to change the angles formed by the adjacent pairs of the coupling portions 75.

(4) The pivots 52 of the secondary upstream fin 41 are located at the most upstream part of the main portion 51 (FIGS. 6 and 9).

Thus, the number of the parts acting on the flow direction of the air for air conditioning A can be reduced in the main portion 51 of the secondary upstream fin 41. It is possible to prevent the air for air conditioning A flowing near the secondary upstream fin 41 from interfering with and being disturbed by the air for air conditioning A flowing near the primary upstream fins 42 to 45.

(5) The hollow 54 is formed between the pivots 52 and the shaft 53 in the main portion 51 of the secondary upstream fin 41 (FIG. 9).

Thus, it is possible to prevent the fork portions 61 from interfering with the main portion 51 at the time of the sliding operation of the operation knob 60.

Further, in the secondary upstream fin 41, the number of the parts acting on the flow direction of the air for air conditioning A can be reduced further. Therefore, the advantage as described in (4) can be improved further.

(6) The secondary upstream fin 41 is located between the pair of the primary upstream fins 43 and 44, out of the above-described plurality of primary upstream fins 42 to 45, and the auxiliary fin 56 is formed integrally with either one of the pair of the primary upstream fins 43 and 44 (the primary upstream fin 43 directly above), which is located upstream of the pivots 52 of the secondary upstream fin 41 and tilts together with the primary upstream fin 43 (FIG. 6).

Thus, the air for air conditioning A flowing near the secondary upstream fin 41 is allowed to flow along the auxiliary fin 56, so that the flow direction of the air for air conditioning A can be changed to the same direction as that of the air for air conditioning A flowing near the primary upstream fins 42 to 45.

(7) Adjacent coupling portions 75 are each rotationally engaged with one pin 74 at the different positions in the longitudinal direction of the pin 74 and are pivotally coupled to each other via the pin 74 (FIGS. 4 and 8).

Since each adjacent pair of the coupling portions 75 is pivoted around a common pin 74, it is possible to bend the coupling portions 75, change the angles formed by the coupling portions 75, and cause the upstream fins 41 to 45 to tilt.

The above-described embodiment may be modified as follows.

<Modification of a Group of Downstream Fins>

The group of the downstream fins may be formed by one downstream fin or three or more downstream fins.

<Modification of Primary Upstream Fins 42 to 45>

The number of the primary upstream fins 42 to 45 may be changed to a number that is different from the one in the above-described embodiment, on condition that the number is plural.

<Modification of Auxiliary Fin 56>

The auxiliary fin 56 may be formed on the primary upstream fin (the primary upstream fin 44 below) that is different from the one in the above-described embodiment, out of the primary upstream fins 43 and 44 that are on both sides of the secondary upstream fin 41.

<Modification of Arms 71 to 73>

The arms 71 to 73 may extend in a different direction from the one in the above-described embodiment, on condition that the arms 71 to 73 extend in a direction orthogonal to the pivots 52 and 47.

With regard to the distances D2 and D3 between the pivots 47 and the pins 74 in the arms 72 and 73 of the primary upstream fins 42 to 45, the identical value may be set for all the primary upstream fins 42 to 45, or different values may be set for the respective primary upstream fins 42 to 45. Further, the above-described distances D2 and D3 may be set for the primary upstream fins divided in groups that are different from the ones in the above-described embodiment. In this case, the identical distance is set for the primary upstream fins in the identical group.

In any of the above-described cases, the distances D2 and D3 are set to be shorter than the distance D1 between the pivot 52 and the pin 74 in the arm 71 of the secondary upstream fin 41.

<Modification of Coupling Rod 76>

Figure 17:
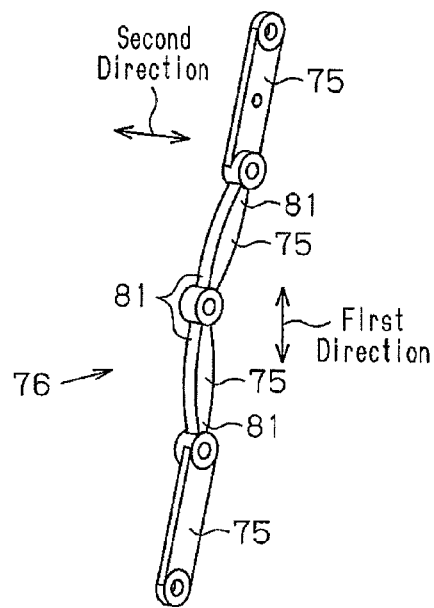
FIG. 17 is a perspective view showing a modification of a coupling rod.
Figure 18:
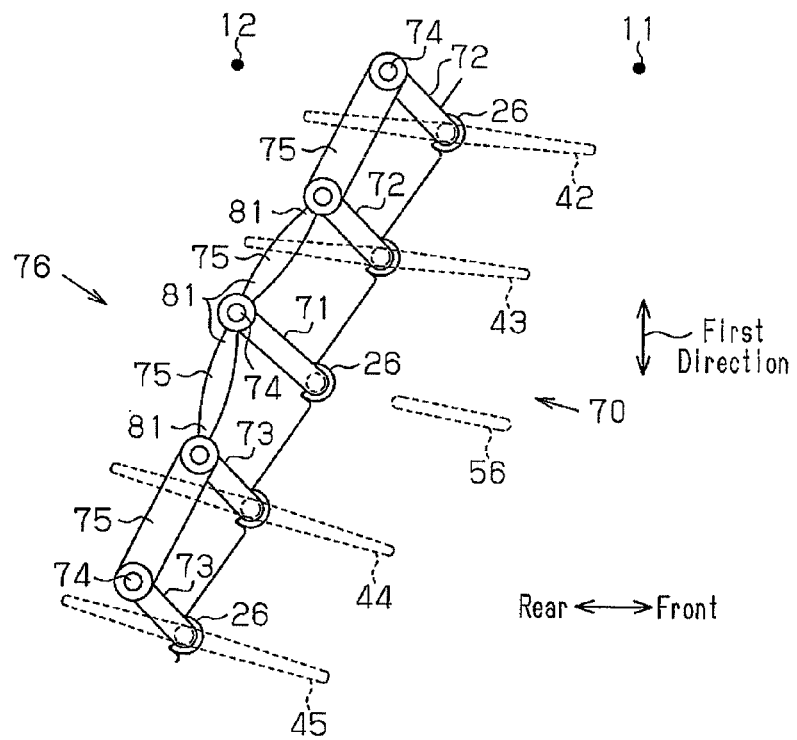
FIG. 18 is a partial side view showing positional relationship between upstream fins, arms and coupling portions, corresponding to FIG. 4, according to an air conditioning register to which the coupling rod shown in FIG. 17 is applied.

As shown in FIGS. 17 and 18, it is possible to employ a coupling rod 76, which is formed by integrally forming the neighboring coupling portions 75 via hinge portions 81, which are thinner than other parts of the coupling portions 75 at an engaging portion with the pins 74. Such a coupling rod 76 can be formed by using, for example, soft resin such as thermoplastic elastomer (TPE).

In this case, adjacent coupling portions 75 are pivotally coupled at the hinge portion 81. Therefore, when each pair of adjacent coupling portions 75 is bent at the hinge portion 81, it is possible to change the angle formed by the coupling portions 75 and to cause the upstream fins 41 to 45 to tilt.

In FIGS. 17 and 18, the same numerals and symbols are given to the same components described in the above-described embodiment.

<Modification of Location to be Applied>

The above-described air conditioning register may be applied as an air conditioning register provided on the location that is different from the instrument panel in the passenger compartment, such as the air conditioning register provided on the dashboard, for example.

The application of the above-described air conditioning register is not limited to the air conditioning register of the vehicle, and a wide range of applications is possible as long as the flow direction of the air for air conditioning sent from the air conditioner to be blown into the passenger compartment is changed and the blowing is blocked.

<Other Modification>

The above-described air conditioning register may be applied to an air conditioning register that has a thin shape and is arranged such that the outlet port 14 is horizontally orientated. In this case, the vehicle lateral direction (the left-right direction) is the first direction, and the vertical direction is the second direction.

Therefore, the present examples and embodiments are to be considered as illustrative and not restrictive and the invention is not to be limited to the details given herein, but may be modified within the scope and equivalence of the appended claims.

The invention claimed is:

1. An air conditioning register to adjust a flow direction of air for air conditioning, the register comprising:
a case having a ventilation passage for the air;
at least one plate-shaped downstream fin that has a downstream fin pivot and is pivotally supported by the case via the downstream fin pivot;
a plurality of primary upstream fins that are located upstream of the downstream fin in the ventilation passage, wherein each of the primary upstream fins extends in a direction orthogonal to the downstream fin, includes a primary upstream fin pivot, and is pivotally supported by the case via the primary upstream fin pivot;
a secondary upstream fin that is located upstream of the downstream fin in the ventilation passage, wherein the secondary upstream fin includes a pivot, extends in the direction orthogonal to the downstream fin, is pivotally supported by the case via the secondary upstream fin pivot, and has a shaft extending along the secondary upstream fin pivot of the secondary upstream fin;
an operation knob that is slidably attached onto the at least one downstream fin and has a pair of fork portions sandwiching the shaft of the secondary upstream fin; and
a link mechanism that couples the primary upstream fins and the secondary upstream fin to each other, wherein the link mechanism includes a plurality of arms and a coupling rod, wherein each arm extends from one of the primary upstream fin pivot of the primary upstream fins and the secondary upstream fin in a direction orthogonal to the secondary upstream fin pivot, wherein each arm has a pin formed at a position offset from the primary upstream fin pivot or secondary upstream fin pivot,
the primary upstream fins and the secondary upstream fin are capable of adjusting the flow direction of the air and selectively opening and closing the ventilation passage by tilting,
a distance between the secondary upstream fin pivot and the pin in the arm of the secondary upstream fin is set to be longer than a distance between the primary upstream fin pivot and the pin in the arm of each primary upstream fin,
the coupling rod couples each arm together via the pins, wherein the coupling rod includes a plurality of coupling portions each of which is coupled to the pins in the arms of each adjacent pair of the arms, and
adjacent coupling portions are pivotally coupled via the pin in the arm.

2. The air conditioning register according to claim 1, wherein the secondary upstream fin includes a main portion, and the secondary upstream fin pivot is located at a most upstream part of the main portion.

3. The air conditioning register according to claim 2, wherein a hollow is formed in the main portion of the secondary upstream fin between the secondary upstream fin pivot and the shaft, the hollow formed to cooperatively slide the operation knob along the shaft of the secondary upstream fin.

4. The air conditioning register according to claim 2, wherein the secondary upstream fin is located between a pair of the primary upstream fins, and one of the pair of the primary upstream fins has an integrally formed auxiliary fin, which is located upstream of the secondary upstream fin pivot and the integrally formed auxiliary fin tilts with the primary upstream fin.

5. The air conditioning register according to claim 1, wherein adjacent coupling portions are each rotationally engaged with one of the pins in the arms at different positions in a longitudinal direction of the pin and are pivotally coupled to each other via a common pin.

6. The air conditioning register according to claim 1, wherein in the coupling rod, adjacent coupling portions are integrally formed via a hinge portion and are rotationally engaged at the hinge portion with the pin, and adjacent coupling portions are pivotally coupled to each other at the hinge portion.

* * * * *